(12) United States Patent
Momose et al.

(10) Patent No.: US 9,645,294 B2
(45) Date of Patent: May 9, 2017

(54) LIQUID CRYSTAL DISPLAY DEVICE, ELECTRONIC APPARATUS, AND ILLUMINATION DEVICE

(71) Applicant: SEIKO EPSON CORPORATION, Tokyo (JP)

(72) Inventors: Yoichi Momose, Matsumoto (JP); Nobutaka Urano, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/680,468

(22) Filed: Apr. 7, 2015

(65) Prior Publication Data

US 2015/0212249 A1  Jul. 30, 2015

Related U.S. Application Data

(62) Division of application No. 13/551,932, filed on Jul. 18, 2012.

(30) Foreign Application Priority Data

Jul. 21, 2011 (JP) .................................. 2011-159626

(51) Int. Cl.
  *G02F 1/1335* (2006.01)
  *G02F 1/1333* (2006.01)
  *F21V 8/00* (2006.01)
(52) U.S. Cl.
  CPC ......... *G02B 6/0016* (2013.01); *G02B 6/0036* (2013.01); *G02B 6/0065* (2013.01);
  (Continued)
(58) Field of Classification Search
  CPC ... G02F 2001/133317; G02F 1/133608; G02F 1/133615
  See application file for complete search history.

(56) References Cited

U.S. PATENT DOCUMENTS 5,584,556 A  12/1996  Yokoyama et al.
6,313,891 B1 *  11/2001  Nagakubo ............ G02B 6/0061
              349/65

(Continued)

FOREIGN PATENT DOCUMENTS

JP         3133859 U      7/2007
JP     2008-020888 A      1/2008

(Continued)

OTHER PUBLICATIONS

May 12, 2015 Office Action issued in U.S. Appl. No. 13/551,932.

(Continued)

*Primary Examiner* — Wen-Ying P Chen
(74) *Attorney, Agent, or Firm* — Oliff PLC

(57) ABSTRACT

Provided is a liquid crystal display device including: an illumination device, and a liquid crystal panel that is arranged so as to be stacked on a light-emitting surface side of the illumination device, wherein the illumination device includes a light guide plate in which a side end surface extending in a first direction is a light incident portion, a plurality of light-emitting elements that align along a first direction and, each of the plurality of light-emitting elements faces a light-irradiating surface in the light incident portion, and a plurality of groove rows that are formed of a plurality of grooves which are linearly arranged in a second direction on an opposite surface facing the light-emitting surface of the light guide plate, the second direction intersects the first direction in an in-plane direction of the light-emitting surface, and that are arranged in parallel in the first direction.

5 Claims, 14 Drawing Sheets

(52) U.S. Cl.
CPC ............ *G02B 6/009* (2013.01); *G02B 6/0043* (2013.01); *G02B 6/0068* (2013.01); *G02B 6/0078* (2013.01); *G02B 6/0085* (2013.01); *G02F 1/133608* (2013.01); *G02F 1/133615* (2013.01); *G02F 2001/133317* (2013.01)

(56) References Cited

U.S. PATENT DOCUMENTS

| | | | |
|---|---|---|---|
| 6,419,369 B1* | 7/2002 | Itoh | G02B 6/0031 362/23.15 |
| 7,458,712 B2 | 12/2008 | Joo et al. | |
| 7,465,083 B2 | 12/2008 | Ohkawa | |
| 2003/0117710 A1* | 6/2003 | Miyamoto | G02B 6/0031 359/613 |
| 2004/0076396 A1 | 4/2004 | Suga | |
| 2008/0074900 A1 | 3/2008 | Sung et al. | |
| 2008/0231590 A1 | 9/2008 | Choi et al. | |
| 2010/0220260 A1 | 9/2010 | Sugita et al. | |
| 2010/0328362 A1 | 12/2010 | Song | |
| 2011/0007524 A1 | 1/2011 | Nagatani | |
| 2011/0013416 A1 | 1/2011 | Kim et al. | |
| 2011/0211138 A1 | 9/2011 | Shang | |

FOREIGN PATENT DOCUMENTS

| | | |
|---|---|---|
| JP | 04-162002 B2 | 10/2008 |
| JP | 2010-123413 A | 6/2010 |
| JP | 2010-204256 A | 9/2010 |
| JP | 2011-009208 A | 1/2011 |
| JP | 2011-018619 A | 1/2011 |
| JP | 05-216030 B2 | 6/2013 |
| TW | M321111 U | 10/2007 |
| WO | 2004/079258 A1 | 9/2004 |

OTHER PUBLICATIONS

Jan. 5, 2015 Office Action issued in U.S. Appl. No. 13/551,932.
Jun. 19, 2014 Office Action issued in U.S. Appl. No. 13/551,932.
Sep. 4, 2015 Office Action issued in U.S. Appl. No. 13/551,932.
Feb. 16, 2016 Office Action issued in U.S. Appl. No. 13/551,932.
Aug. 25, 2016 Office Action issued in U.S. Appl. No. 13/551,932.
Feb. 28, 2017 Office Action issued in U.S. Appl. No. 13/551,932.

* cited by examiner

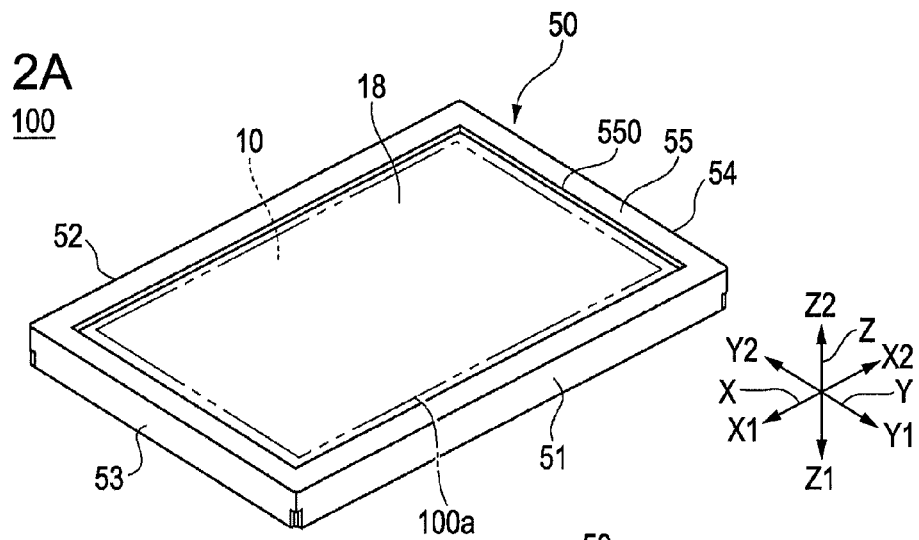
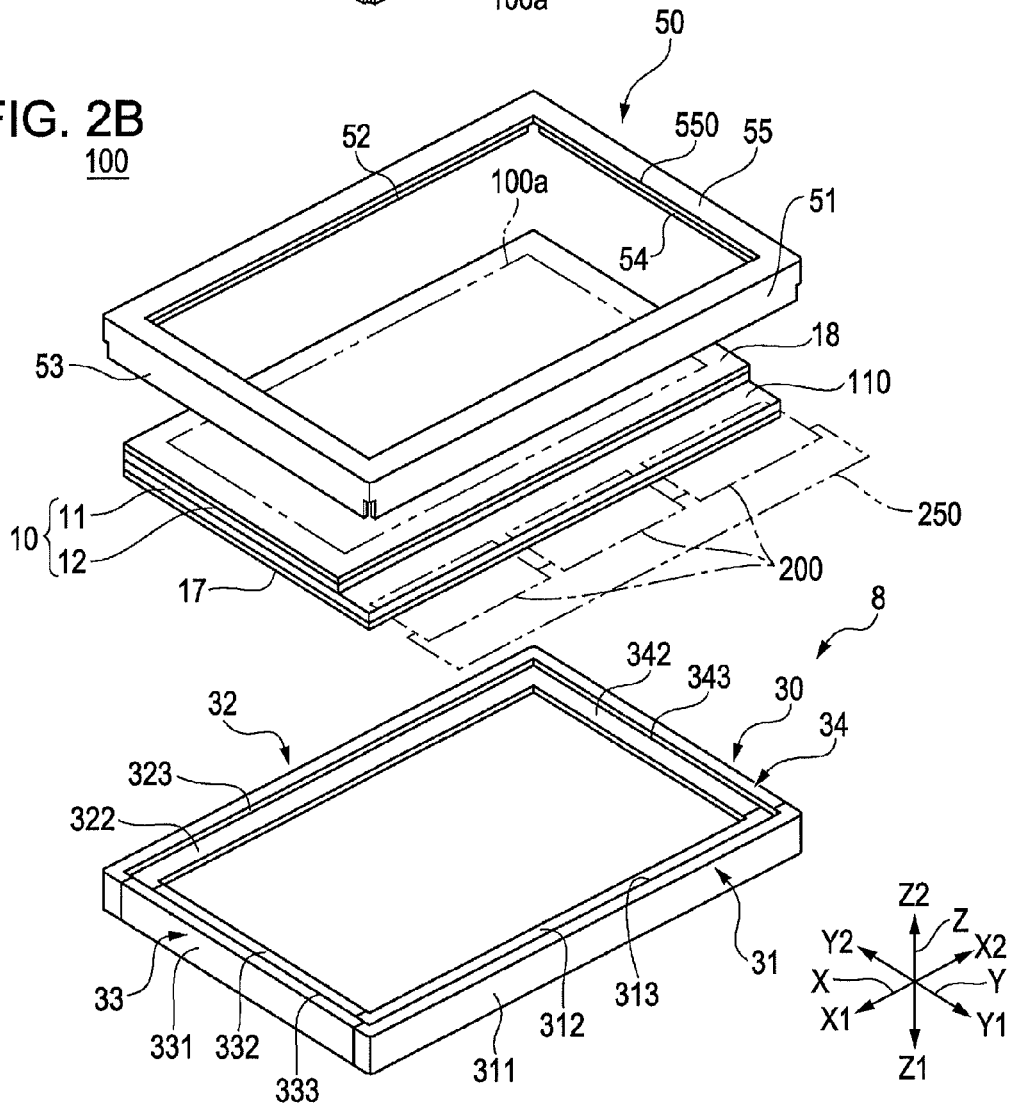

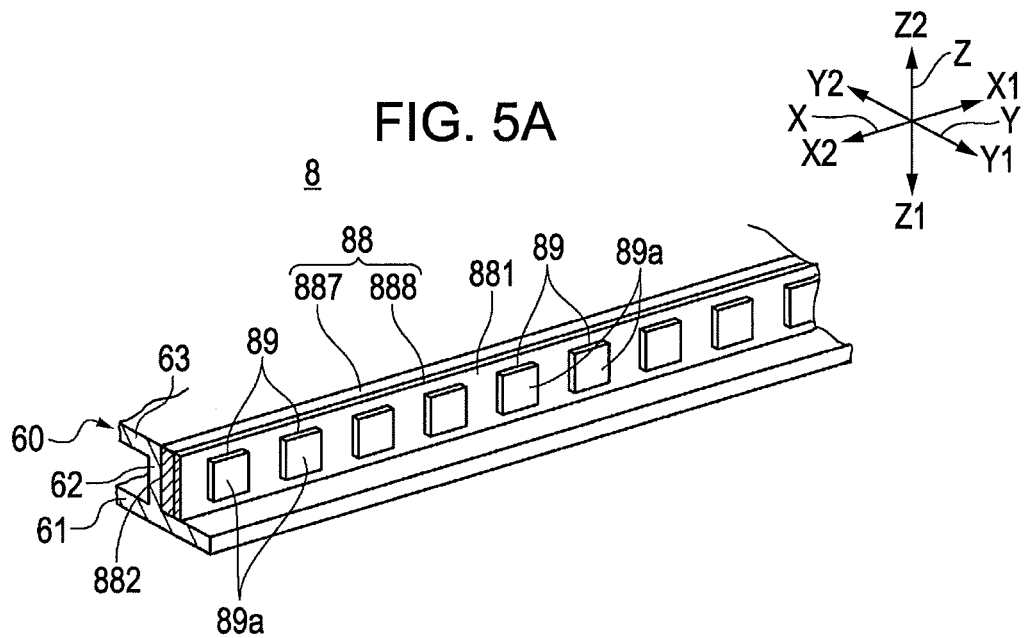
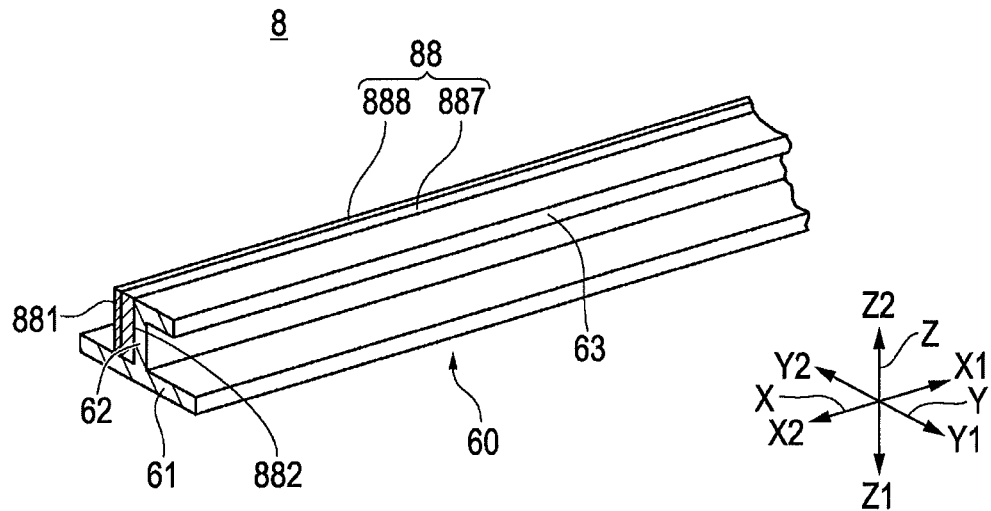

FIG. 10
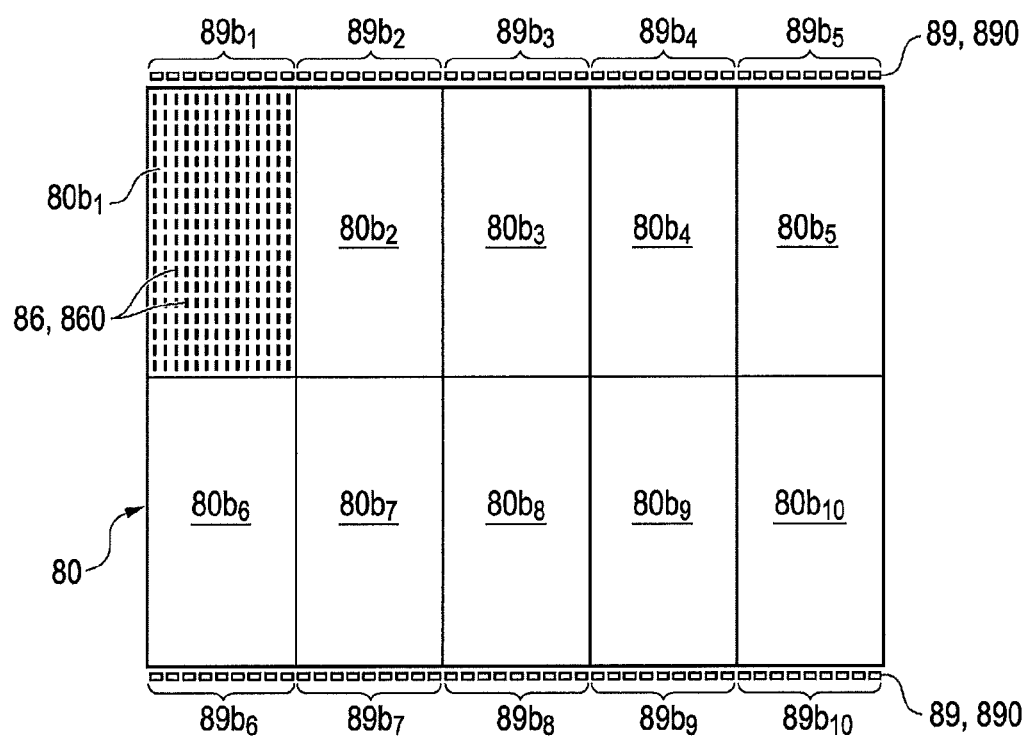
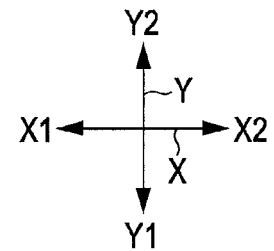

LIQUID CRYSTAL DISPLAY DEVICE, ELECTRONIC APPARATUS, AND ILLUMINATION DEVICE

This is a Divisional application of application Ser. No. 13/551,932 filed Jul. 18, 2012 which is a National Phase of JP2011-159626 filed 2011 Jul. 21. The disclosure of the prior application is hereby incorporate by reference herein in its entirety.

BACKGROUND

1. Technical Field

The present invention relates to a liquid crystal display device having an illumination device including a light guide plate and a light source, an electronic apparatus including the liquid crystal display device, and the illumination device.

2. Related Art

A liquid crystal display device including a transmissive liquid crystal panel has an illumination device 1008 in which a light source 1890 is arranged in a light incident portion 1080a composed of a side end face extending in an X-axis direction, for example, as shown in FIGS. 14A and 14B, on a light guide plate 1080, and the liquid crystal panel is arranged so as to be stacked on a light-emitting surface 1080b side of the light guide plate 1080. With regard to illumination devices such as illumination device 1008, a configuration in which a plurality of grooves 1086 running in a longitudinal direction in the x-axis direction, that is the direction in which the light incident portion 1080a extends, are formed on a bottom surface 1080c facing the light-emitting surface 1080b on the light guide plate 1080, has been proposed so as to increase the emission intensity of the illumination light (see, JP-A-2008-20888).

In the illumination device 1008 having the above described configuration, light emitted from the light source 1890 is incident to the inside of the light guide plate 1080 from the light incident portion 1080a as shown by arrow L11, and then advances through the inside of the light guide plate 1080 while repeating total reflection inside the light guide plate 1080. Next, as shown by arrow L12, the light is reflected and diffused on a side surface 1867 of the groove 1086 extending parallel to the X-axis direction, and therefore the illumination light is emitted from the light-emitting surface 1080b as shown by arrow L13. When this happens, light reflected in both end portions 1868 and 1869 in the X-axis direction on the groove 1086 advances in a variety of directions, thereby enhancing uniformity of the illumination light emitted from the light-emitting surface 1080b of the light guide plate 1080.

However, as in JP-A-2008-20888, in the case in which the groove 1086 is provided running in the longitudinal direction in the X-axis direction (the direction in which the light incident portion 1080a extends), the side surface 1867 of the groove 1086 crosses a direction in which light advances inside the light guide plate 1080, and therefore, an optical component advancing in a Y-axis direction inside the light guide plate 1080 is excessively reduced by the groove 1086. For this reason, there is a problem in that, in the illumination light emitted from the light guide plate 1080, the intensity of the illumination light near the light incident portion 1080a becomes too strong, and the intensity of the illumination light at a position a distance from the light incident portion 1080a is reduced by that amount. In order to solve the problem, a configuration in which the density of the grooves 1086 in a region close to the light incident portion 1080a is made different to the density in a region spaced apart from the light incident portion 1080a is conceivable; however, in a case in which the light guide plate 1080 is enlarged accompanying enlargement of the liquid crystal panel, adjustment of the density of the grooves 1086 does not solve the above described problem.

In addition, in the liquid crystal display device, a local dimming method in which the light source 1890 is divided into a plurality of blocks along the X-axis direction, and an emission amount of the light source 1890 is controlled for each block so as to improve contrast and relieve residual images and the like is adopted. In this case, when adopting the illumination device 1008 shown in FIGS. 14A and 14B, the light is reflected and diffused on the side surface 1867 of the groove 1086 and in both the end portions 1868 and 1869 in the X-axis direction, and therefore, leakage of light to the adjacent region is excessive, resulting in a reduction in the effect of adopting the local dimming method.

SUMMARY

An advantage of some aspects of the invention is to provide a liquid crystal display device which may improve emission characteristics of illumination light from a light guide plate by enabling light emitted from a light source to easily advance through the inside of the light guide plate, an electronic apparatus including the liquid crystal display device, and the illumination device.

According to an aspect of the invention, there is provided a liquid crystal display device, including: an illumination device; and a liquid crystal panel that is arranged so as to be stacked on a light-emitting surface side of the illumination device, wherein the illumination device includes a light guide plate in which a side end surface extending in a first direction is a light incident portion, a plurality of light-emitting elements that align along a first direction and, each of the plurality of light-emitting elements faces a light-irradiating surface in the light incident portion, and a plurality of groove rows that are formed of a plurality of grooves which are linearly arranged in a second direction on an opposite surface facing the light-emitting surface of the light guide plate, the second direction intersects the first direction in an in-plane direction of the light-emitting surface, and that are arranged in parallel in the first direction.

In the liquid crystal display device, the side end surface extending in the first direction in the light guide plate is the light incident portion, and light emitted from the light source is incident to the inside of the light guide plate from the light incident portion, and then advances through the inside of the light guide plate while repeating total reflection inside the light guide plate. Next, the light is reflected and diffused in grooves, and illumination light is emitted from the light-emitting surface. Here, since the groove faces the longitudinal direction in the second direction (a direction in which light advances inside the light guide plate), a part of the light inside the light guide plate passes between the grooves, and is reflected on a side surface of the groove parallel to the second direction while advancing in a direction spaced apart from the light incident portion in the second direction, and therefore, the light advances in a direction spaced apart from the light incident portion in the second direction. For this reason, intensity of illumination light at a position spaced apart from the light incident portion may be enhanced. In addition, since part of the light inside the light guide plate is reflected on an end portion of a side where the light incident portion is positioned in the groove, and advances in the first direction, and therefore, the light advances even in the first direction. Therefore, even when the liquid crystal panel and the light guide plate are enlarged, the intensity distribution of the illumination light may be uniformalized in both the first direction and the second direction.

In the liquid crystal display device, the plurality of light-emitting elements may be divided into a plurality of blocks in the first direction, and include a light source driving unit that controls, for each of the blocks, an emission amount of light-emitting elements in conjunction with drive with respect to the liquid crystal panel. When adopting this configuration, since the groove faces the longitudinal direction in the second direction (a direction in which light advances inside the light guide plate), diffusion and reflection of the light in the first direction primarily occur only in an end portion of the light source side of the groove, and therefore, the light is reflected on side surfaces of the groove parallel to the second direction, and advances in a direction spaced apart from the light incident portion. For this reason, when performing a local dimming method or a scan backlight method, leakage of light to the adjacent region on the light guide plate may be kept low, thereby improving contrast or relieving residual images.

In the liquid crystal display device, an existing density of an end portion of the plurality of grooves positioned on a side of the light incident portion may be increasingly increased in the second direction, as a distance from a side where the light incident portion is positioned is increased. In this configuration, intensity distribution of the illumination light may be uniformalized in the second direction.

In the liquid crystal display device, a pitch of the end portion of the plurality of grooves may be increasingly reduced in the second direction, as the distance from the side where the light incident portion is positioned is increased.

In the liquid crystal display device, dimensions of the plurality of grooves in the second direction may be the same, and a spacing between adjacent grooves in the second direction may be increasingly reduced in the second direction, as the distance from the side where the light incident portion is positioned is increased.

In the liquid crystal display device, distances between adjacent grooves in the second direction may be the same, and a dimension of the plurality of grooves in the second direction is increasingly reduced in the second direction, as the distance from the side where the light incident portion is positioned is increased.

In the liquid crystal display device, a dimension of the plurality of grooves in the first direction may be increasingly increased in the second direction, as the distance from the side where the light incident portion is positioned is increased.

In the liquid crystal display device, the light incident portion and the plurality of light-emitting elements may be provided on side end surfaces positioned on both sides of the light guide plate in the second direction.

In the liquid crystal display device, the plurality of grooves may be formed by irradiation by a laser beam.

According to another aspect of the invention, there is provided an electronic apparatus such as a liquid crystal television, and the like in which the liquid crystal display device of the invention is used.

According to still another aspect of the invention, there is provided an illumination device including a light guide plate in which a side end surface extending in a first direction is a light incident portion; and a plurality of light-emitting elements that align along a first direction and, each of the plurality of light-emitting elements faces a light-irradiating surface in the light incident portion, wherein a plurality of groove rows that are formed of a plurality of grooves which are linearly arranged in a second direction on an opposite surface facing the light-emitting surface of the light guide plate, the second direction intersects the first direction in an in-plane direction of the light-emitting surface, and that are arranged in parallel in the first direction.

In the invention, since the side end surface extending in the first direction on the light guide plate is considered as the light incident portion, the light emitted from the light source is incident to the inside of the light guide plate from the light incident portion, and then advances through the inside of the light guide plate while repeating total reflection inside the light guide plate. Next, the light is reflected and diffused on the groove, and illumination light is emitted from the light-emitting surface. Here, since the groove faces the longitudinal direction in the second direction (a direction in which light advances inside the light guide plate), the light may easily advance in the second direction inside the light guide plate. Due to this, the intensity of the illumination light at a position of being spaced apart from the light incident portion may be enhanced. Therefore, even when the light guide plate is size-enlarged, the intensity distribution of the illumination light may be uniformalized.

BRIEF DESCRIPTION OF THE DRAWINGS

The invention will be described with reference to the accompanying drawings, wherein like numbers reference like elements.

FIGS. 2A and 2B are explanatory diagrams of the entire configuration of a liquid crystal display device according to a first embodiment of the invention;

FIGS. 5A and 5B are explanatory diagrams illustrating a configuration of a periphery of a light source substrate which is used in an illumination device of a liquid crystal display device according to a first embodiment of the invention;

FIG. 10 is an explanatory diagram illustrating a planar configuration of a light guide plate which is used in an illumination device of a liquid crystal display device according to a second embodiment of the invention;

DESCRIPTION OF EXEMPLARY EMBODIMENTS

Figure 1A:
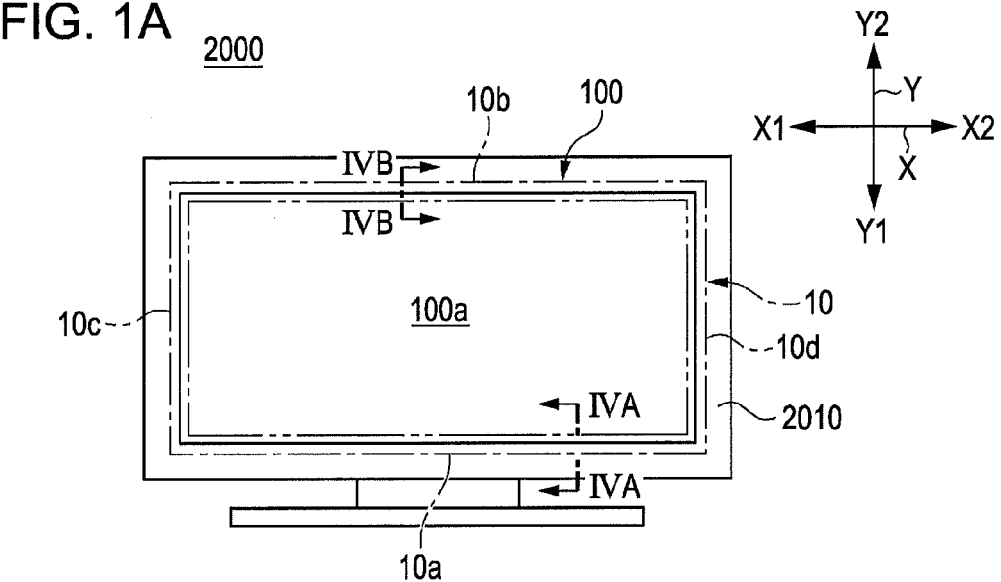
FIGS. 1A and 1B are explanatory diagrams of a liquid crystal television (electronic apparatus) including a liquid crystal display device according to a first embodiment of the invention.

A form in which the invention is applied to a liquid crystal display device for a liquid crystal television will be described with reference to the accompanying drawings. In addition, in the drawings referred by the following descriptions, a scale is made different for each layer or each member so as to enable a size of each layer or each member to be recognizable on the drawings. In addition, in the following descriptions, directions which intersect each other in an in-plane direction of a light guide plate or a liquid crystal panel are referred to as an X-axis direction (a first direction) and a Y-axis direction (a second direction), and a direction intersecting in the X-axis direction and the Y-axis direction is referred to as a Z-axis direction (a third direction). In addition, in the referred drawings, one side of the X-axis direction is indicated as an X1 side, the other side thereof is indicated as an X2 side, one side of the Y-axis direction is indicated as a Y1 side, the other side thereof is indicated as a Y2 side, one side of the Z-axis (a rear surface side 9 of the light guide plate) is indicated as a Z1 side (a lower side), and the other side thereof (a side where illumination light or display light is emitted) is indicated as a Z2 side (an upper side). In addition, in the present embodiment, a longitudinal direction of the light guide plate or the liquid crystal panel is referred to as an X-axis direction, and a short side direction thereof is referred to as a Y-axis direction.

First Embodiment

Entire Configuration

Figure 1B:
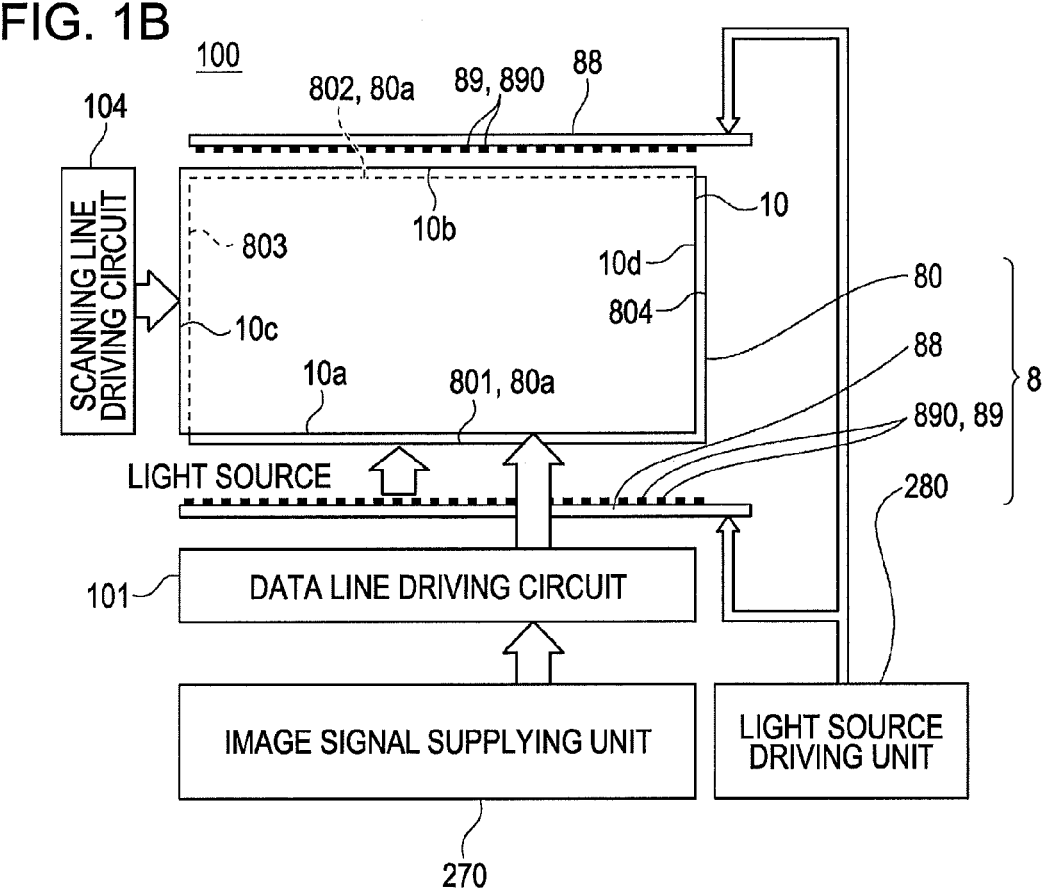

FIGS. 1A and 1B are explanatory diagrams of a liquid crystal television (electronic apparatus) including a liquid crystal display device according to a first embodiment of the invention, and FIG. 1A is a schematic explanatory diagram of an appearance of the liquid crystal television, and FIG. 1B is a block diagram illustrating an electrical configuration of the liquid crystal display device.

An electronic apparatus 2000 shown in FIG. 1A is a liquid crystal television, and includes a liquid crystal display device 100, a frame for a television 2010, or the like. The liquid crystal display device 100 includes a liquid crystal panel 10 which will be described below, an image signal supplying unit 270 that supplies an image signal to the liquid crystal panel 10, and an illumination device 8 that supplies illumination light to the liquid crystal panel 10. In addition, the liquid crystal display device 100 includes a scanning line driving circuit 104 that drives a scanning line extending in the X-axis direction (the first direction) on the liquid crystal panel 10, and a data line driving circuit 101 that drives a data line extending in the Y-axis direction (the second direction) on the liquid crystal panel 10. With regard to the scanning line driving circuit 104 and the data line driving circuit 101, a configuration in which both the scanning line driving circuit 104 and the data line driving circuit 101 are built in the liquid crystal panel 10 may be adopted. In addition, a configuration in which one of the scanning line driving circuit 104 and the data line driving circuit 101 is built in the liquid crystal panel 10, and the other thereof is built in a driving IC separately from the liquid crystal panel 10, or a configuration in which both the scanning line driving circuit 104 and the data line driving circuit 101 are built in the driving IC separately from the liquid crystal panel 10 may be adopted. In addition, a configuration in which one of the scanning line driving circuit 104 and the data line driving circuit 101 is built in the liquid crystal panel 10, and the other thereof is built in a driving IC COG-mounted in the liquid crystal panel 10 may be adopted.

In the present embodiment, the illumination device 8 includes a light guide plate 80 which is arranged so as to be stacked on the liquid crystal panel 10, a plurality of light-emitting elements 89 which are arranged as a light source 890 along a side end surface that is a light incident portion 80a from among side end surfaces of the light guide plate 80, a light source substrate 88 in which the plurality of light-emitting elements 89 are mounted, a light source driving unit 280 which drives the light-emitting element 89. In the present embodiment, the liquid crystal panel 10 is formed in a rectangular shape, and has four sides 10a, 10b, 10c, and 10d. Among the four sides 10a, 10b, 10c, and 10d, the side 10a is a long side positioned on one side Y1 in the Y-axis direction, the side 10b is a long side positioned on the other side Y2 in the Y-axis direction, the side 10c is a short side positioned on one side X1 in the X-axis direction, and the side 10d is a short side positioned on the other side X2 in the X-axis direction. To correspond to the above described shape, the light guide plate 80 has four side end surfaces 801, 802, 803, and 804. Among the side end surfaces 801, 802, 803, and 804, the side end surface 801 is positioned on the long side of one side Y1 in the Y-axis direction, the side end surface 802 is positioned on the long side of the other side Y2 in the Y-axis direction, the side end surface 803 is positioned on the short side of one side X1 in the X-axis direction, and the side end surface 804 is positioned on the short side of the other side X2 in the X-axis direction. In the present embodiment, among the four side end surfaces 801, 802, 803, and 804 of the light guide plate 80, two side end surfaces 801 and 802 extending in the long side direction (the X-axis direction) at a position which faces in the short side direction (the Y-axis direction) are the light incident portion 80a. For this reason, the light-emitting elements 89 are aligned along the two side end surfaces 801 and 802 (the light incident portion 80a) of the light guide plate 80, and the light source substrate 88 extends along the two side end surfaces 801 and 802 (the light incident portion 80a) of the light guide plate 80.

Specific Configuration of Liquid Crystal Display Device 100

Figure 3:
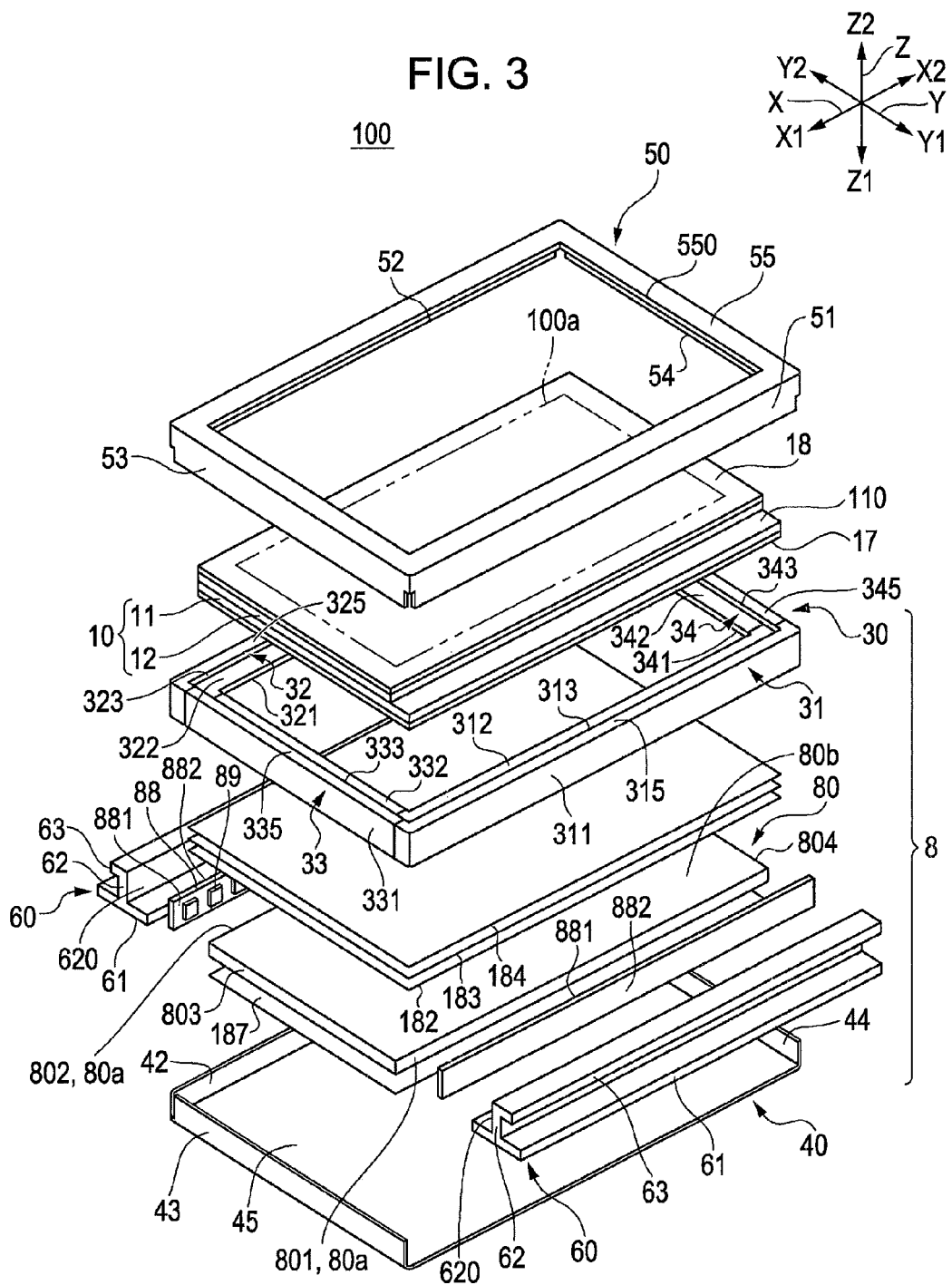
FIG. 3 is an exploded perspective view obtained when further disassembling, in more detail, a liquid crystal display device according to a first embodiment of the invention.
Figure 4A:
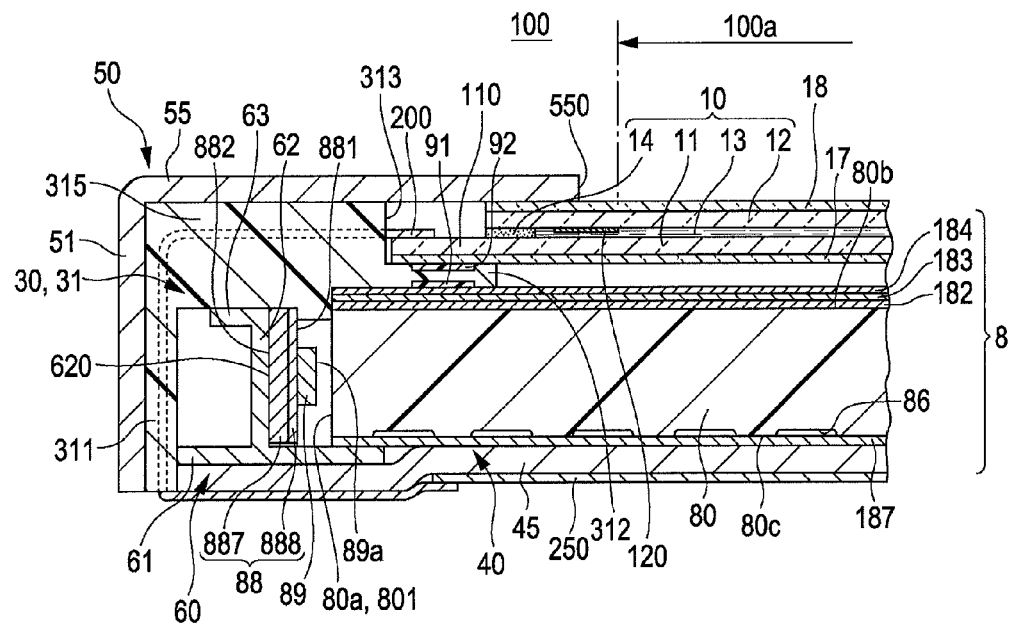
FIGS. 4A and 4B are cross-sectional views of a liquid crystal display device according to a first embodiment of the invention.
Figure 4B:
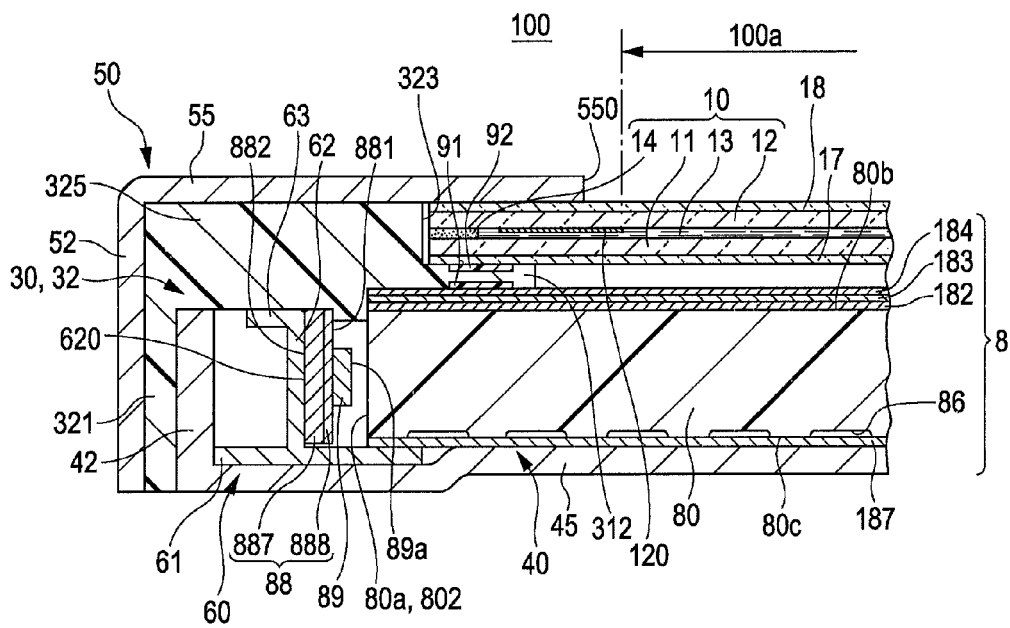

FIGS. 2A and 2B are explanatory diagrams of the entire configuration of the liquid crystal display device 100 according to a first embodiment of the invention, FIGS. 2A and 2B are a perspective view and an exploded perspective view of the liquid crystal display device 100. FIG. 3 is an exploded perspective view obtained when further disassembling, in a minute manner, the liquid crystal display device 100 according to a first embodiment of the invention, and FIGS. 4A and 4B are cross-sectional views of the liquid crystal display device 100 according to a first embodiment of the invention. FIGS. 4A and 4B are a cross-sectional view when cutting the liquid crystal display device 100 along IVA-IVA line of FIG.

1A, and a cross-sectional view when cutting the liquid crystal display device 100 along IVB-IVB line of FIG. 1A.

In FIGS. 2A to 4B, the liquid crystal display device 100 of the present embodiment includes the illumination device 8 so-called a backlight device, and a transmissive liquid crystal panel 10 which is arranged so as to be stacked on an upper surface side (light-emitting surface side) of the illumination device 8. In the liquid crystal display device 100, the illumination device 8 includes a first frame 40 (a lower metal frame) made of a metal material, which is arranged to cover a rear surface side (one side Z1 in the Z-axis direction) of the light guide plate 80, a second frame 30 (a resin frame) made of a resin material, which holds the illumination device 8 so as to surround the illumination device 8 while holding an end portion of the liquid crystal panel 10 above the first frame 40, and a third frame 50 (an upper metal frame) made of a metal material, which is arranged on an upper side of the second frame 30 (the other side Z2 in the Z-axis direction).

The second frame 30 has a rectangular frame shape which surrounds the liquid crystal panel 10 while holding the end portion of the liquid crystal panel 10, and in the present embodiment, the second frame 30 is composed of four frame plates 31, 32, 33, and 34 which are divided for each side to correspond to four sides of the liquid crystal panel 10. The second frame 30 is a black color, and acts as a light absorbing member, thereby preventing the occurrence of stray light inside the illumination device 8. The frame plates 31, 32, 33, and 34 respectively includes side plate portions 311, 321, 331, and 341 which extend downwards on an outer surface side of each of the frame plates 31, 32, 33, and 34, upper plate portions 315, 325, 335, and 345 (end plate portions) which are bent toward the inside from upper end edges of the side plate portions 311, 321, 331, and 341, and protruding plate portions 312, 322, 332, and 342 which protrude to an inner side from an intermediate position in the height direction of the upper plate portions 315, 325, 335, and 345. For this reason, end portions 313, 323, 333, and 343 are formed in an inner side of each of the frame plates 31 to 34 by the protruding plate portions 312, 322, 332, and 342, and the liquid crystal panel 10 is held by the end portions 313, 323, 333, and 343 and the protruding plate portions 312, 322, 332, and 342. In addition, on a lower side of each of the protruding plate portions 312, 322, 332, and 342, the light guide plate 80 of the illumination device 8 or the light-emitting element 89, and the like are arranged.

The first frame 40 is formed by a press process, and the like which is performed with respect to a thin metal plate such as an SUS plate, and the like. The first frame 40 has three side plate portions 42 to 44 which stand from three sides except one side Y1 in the Y-axis direction from among a bottom plate portion 45 and an outer peripheral edge of the bottom plate portion 45, and is formed in a rectangular box shape opened at the top. The side plate portions 321, 331, and 341 of the second frame 30 are stacked on the outside of the side plate portions 42 to 44 of the first frame 40. In addition, the side plate portion 311 of the second frame 30 covers one side Y1 of the first frame 40 in the Y-axis direction.

As in the first frame 40, the third frame 50 is formed by the press process, and the like which is performed with respect to the thin metal plate such as the SUS plate, and the like. The third frame 50 includes a rectangular upper plate portion 55 (an end plate portion), and four side plate portions 51 to 54 which are bent downward from an outer peripheral edge of the upper plate portion 55, and thereby is formed in a rectangular frame shape opened at the bottom. The side plate portions 51 to 54 are stacked on the outside of the side plate portions 311, 321, 331, and 341 of the second frame 30. A rectangular window 550 that emits light emitted from the liquid crystal panel 10 is formed in the upper plate portion 55, and the upper plate portion 55 covers an outer edge portion of a display light-emitting side over the whole periphery among the display light emitting sides of the liquid crystal panel 10. At the same time, the upper plate portion 55 of the third frame 50 is provided so as to completely cover upper portions of the upper plate portions 315, 325, 335, and 345 (the end plate portion) of the second frame 30.

The third frame 50, the second frame 30, and the first frame 40 which are configured as above are coupled by screws (not shown), or the like, and is held in a state of housing the liquid crystal panel 10 or the illumination device 8 therein. Here, as shown in FIGS. 4A and 4B, flexible sheets 71 and 72 are stuck on lower surfaces and upper surfaces of the protruding plate portions 312, 322, 332, and 342 of the second frame 30. For this reason, when assembling the liquid crystal display device 100, the liquid crystal panel 10 is supported by the protruding plate portions 312, 322, 332, and 342 through the flexible sheet 72. In addition, when assembling the liquid crystal display device 100, an optical sheet (a diffusion sheet 182, prism sheets 183 and 184, etc.) of the illumination device 8 is prevented from floating or being positionally deviated through the flexible sheet 71.

Configuration of Liquid Crystal Panel 10

As shown in FIGS. 2A to 4B, the liquid crystal panel 10 is formed in a rectangular planar shape, and includes an element substrate 11 on which a pixel electrode (not shown), and the like is formed, a counter substrate 12 which is disposed opposite the element substrate 11 through a predetermined gap, and a rectangular frame-shaped sealing member 14 which bonds the counter substrate 12 and the element substrate 11. In the liquid crystal panel 10, a liquid crystal layer 13 is held within a region enclosed by the sealing member 14. The element substrate 11 and the counter substrate 12 are composed of a transparent substrate such as a glass substrate, and the like. On the element substrate 11, a plurality of scanning lines (not shown) extend in the X-axis direction, whereas a plurality of data lines (not shown) extend in the Y-axis direction. To correspond to the crosspoints of the scanning lines and the data lines, a switching element (not shown) and a pixel electrode (not shown) are provided.

In the present embodiment, the counter substrate 12 is arranged on a display light-emitting side, and the element substrate 11 is arranged on the illumination device 8 side. In addition, a frame layer 120 which is composed of a rectangular frame shaped-light shielding layer along inner edges of four sides of the sealing member 14 is formed on a surface of the counter substrate 12 facing the element substrate 11, and a region defined by an inner edge of the frame layer 120 is an image display region 100*a*. In addition, an inner edge of the upper plate portion 55 of the third frame 50 is an intermediate position in the width direction of the frame layer 120, and the window 550 of the third frame 50 is stacked on an inner circumferential portion of the image display region 100*a* and the frame layer 120.

The liquid crystal panel 10 is configured as a liquid crystal panel obtained in a TN (Twisted Nematic) method, an ECB (Electrically Controlled Birefringence) method, or a VAN (Vertical Aligned Nematic) method. In the liquid crystal panel 10, the pixel electrode is formed on the element substrate 11, and a common electrode (not shown) is formed on the counter substrate 12. In addition, when the liquid crystal panel 10 is a liquid crystal panel obtained in an IPS (In Plane Switching) method and an FFS (Fringe Field Switching) method, the common electrode is provided on the element substrate 11 side. In addition, the element substrate 11 may be arranged on the display light-emitting side with respect to the counter substrate 12. An upper polarizing plate 18 is arranged so as to be stacked on an upper surface of the liquid crystal panel 10, and a lower polarizing plate 17 is arranged between a lower surface of the liquid crystal panel 10 and the illumination device 8.

In the present embodiment, the element substrate 11 is larger than the counter substrate 12. For this reason, the element substrate 11 has a protruding portion 110 which protrudes from an end portion of the counter substrate 12 on one side Y1 in the Y-axis direction, and a flexible wiring substrate 200 is connected to an upper surface of the protruding portion 110. The flexible wiring substrate 200 is connected to a circuit substrate 250 composed of a rigid substrate, and a control IC (not shown) constituting the image signal supplying unit 270 which has been described with reference to FIGS. 1A and 1B, and a light source driving IC (not shown) constituting the light source driving unit 280 are mounted in the circuit substrate 250.

Configuration of Illumination Device 8

FIGS. 5A and 5B are explanatory diagrams illustrating a configuration of a periphery of the light source substrate 88 which is used in the illumination device 8 of the liquid crystal display device 100 according to a first embodiment of the invention, and FIGS. 5A and 5B are respectively an explanatory diagram schematically illustrating a state of an one surface 881 side of the light source substrate 88, and an explanatory diagram schematically illustrating a state of the other surface side 882 of the light source substrate 88. In addition, configurations of the light-emitting element 89 and the light source substrate 88 which are arranged on the two side end surfaces 801 and 802 (the light incident portion 80a) facing each other in the Y-axis direction of the light guide plate 80 are the same. Accordingly, in FIG. 5A, the light-emitting element 89 and the light source substrate 88 which are arranged on the side end surface 802 of the light guide plate 80 are shown, and in FIG. 5B, the light source substrate 88, and the like which is arranged on the side end surface 801 of the light guide plate 80 is shown.

As shown in FIGS. 3 to 4B, the illumination device 8 includes the light guide plate 80 which is arranged so as to be stacked on the lower surface side of the liquid crystal panel 10, and the plurality of light-emitting elements 89 which are arranged on the light incident portion 80a of the light guide plate 80 from one end side (one side X1 in the X-axis direction) of the light incident portion 80a towards the other end side (the other side X2 in the X-axis direction) thereof while directing a light-emitting surface 89a. In the present embodiment, the plurality of light-emitting elements 89 are mounted on one surface 881 of the light source substrate 88 extending in the X-axis direction along the light incident portion 80a. The light-emitting element 89 is an LED (Light Emitting Diode) which emits white light, and emits light of the light source as divergent light.

In the illumination device 8 according to the present embodiment, from among the side end surfaces 801, 802, 803, and 804 of the light guide plate 80, two side end surfaces 801 and 802 facing each other in the Y-axis direction are used as the light incident portion 80a. For this reason, the plurality of light-emitting elements 89 are arranged from one end side of each of the two light incident portion 80a (the side end surfaces 801 and 802) towards the other end thereof while directing the light-emitting surface 89a in two light incident portion 80a (the side end surfaces 801 and 802) of the light guide plate 80. In addition, two light source substrates 88 extend along the two light incident portion 80a (the side end surfaces 801 and 802), and the plurality of light-emitting elements 89 are mounted on one surface 881 of each of the two light source substrates 88.

In the present embodiment, the light guide plate 80 is made of a light-transmissive resin plate consisting of acrylic resin, poly-methyl styrene, polycarbonate resin, and the like, and a reflection sheet 187 is arranged so as to be stacked between a lower surface 80c (a surface on the opposite side of the light-emitting surface 80b/an opposite surface) of the light guide plate 80 and the bottom plate portion 45 of the first frame 40. A resin plate used in the light guide plate 80 is formed by an extrusion molding, an injection molding, and the like.

The optical sheet such as the diffusion sheet 182, the prism sheets 183 and 184, and the like is arranged so as to be stacked between the upper surface of the light guide plate 80 (the light-emitting surface 80b) and the liquid crystal panel 10. The diffusion sheet 182 is composed of a sheet including a coating layer in which silica particles are dispersed in the light-transmissive resin such as acrylic resin, polycarbonate resin, and the like. In the present embodiment, two prism sheets 183 and 184 are arranged such that their ridge lines are orthogonal to each other. For this reason, illumination light emitted from the light-emitting surface 80b of the light guide plate 80 is diffused in all directions by the diffusion sheet 182, and then the directivity having a peak in a front direction of the liquid crystal panel 10 is imparted to the illumination light by two prism sheets 183 and 184. In addition, as will be described below with reference to FIGS. 6A and 6B, in the light guide plate 80, a plurality of grooves 86 which are composed of linear fine recessed portions are formed on the lower surface 80c where the reflection sheet 187 is positioned.

In a region which is stacked on a side where the side end surfaces 801 and 803 being the light incident portion 80a of the light guide plate 80 are positioned, the bottom plate portion 45 of the first frame 40 has a step partially formed so as to secure a gap between the lower surface 80c of the light guide plate 80 and the first frame 40, and is bent towards the light guide plate 80. Therefore, the reflection sheet 187 and a lower plate portion 61 of a light source supporting member 60 may be inserted into a gap between the lower surface 80c of the light guide plate 80 and the bottom plate portion 45. In addition, a recessed portion is formed on a rear surface side of the first frame 40 by partially bending the bottom plate portion 45 of the first frame 40 towards the light guide plate 80, so that the flexible wiring substrate 200 is bent up to a lower surface (a rear surface) of the bottom plate portion 45 of the first frame 40 to extend, and the circuit substrate 250 is arranged within the recessed portion so as to be housed within a depth of the recessed portion. As a result, it is possible to achieve a thinner illumination device 8.

In the present embodiment, the light source substrate 88 is arranged such that one surface 881 where the light-emitting element 89 is mounted faces the light incident portion 80a of the light guide plate 80. In addition, the light source substrate 88 has a configuration in which a wiring pattern and lands are provided together with an insulating layer on an one surface 881 side of a plate-shaped metal plate 887 (a supporting plate) which extends along the light incident portion 80a. The configuration may be realized by sticking the flexible wiring substrate 888, to the one surface 881 side of the metal plate 887, on which a resin base material layer, the wiring pattern, an insulating protective layer, and the like are laminated in the stated order. Accordingly, in a land in which the metal plate 887 and chips of the wiring pattern and the light-emitting element 89 are mounted, insulation is electrically secured. In the present embodiment, the metal plate 887 is made of an aluminum material, and acts as a heat sink plate of the heat generated from the light-emitting element 89 while securing mechanical strength of the light source substrate 88.

As shown in FIGS. 3 to 5B, the light source supporting member 60 supporting the light source substrate 88 is respective arranged on the other surface 882 sides of the two light source substrates 88, and is arranged to be held between the first frame 40 and the second frame 30. In the present embodiment, the light source supporting member 60 is a bar-like metal member which extends along the other surface 882 of the light source substrate 88, and is fixed as tightly surface-contacted on the entire surface of the other surface 882 of the light source substrate 88 and a substrate holding surface 620 of a supporting plate portion 62 which will be described below. In addition, the light source supporting member 60 includes a lower plate portion 61 which is stacked on the bottom plate portion 45 of the first frame 40, and the supporting plate portion 62 which constitutes a wall surface protruding upwards from an intermediate position in the width direction of the lower plate portion 61. In addition, the light source supporting member 60 includes an upper plate portion 63 which is bent from the supporting plate portion 62 to the opposite side of a side where the light guide plate 80 is positioned, on an upper end side (the opposite side of the lower plate portion 61) of the supporting plate portion 62, and the upper plate portion 63 is fixed on at least one side of the upper plate portion 55 of the third frame 50 and the upper plate portions 315 and 325 of the second frame 30 by screws, or the like.

In the light source supporting member 60 configured as above, a surface of a side where the light guide plate 80 of the supporting plate portion 62 is positioned is the substrate holding surface 620 holding the light source substrate 88, and the light source substrate 88 is fixed to the substrate holding surface 620 by screws, or the like. In this state, the light source substrate 88 is stacked in a state in which the other surface 882 (the metal plate 887) is surface-contacted on the substrate holding surface 620 of the light source supporting member 60. In addition, the light source supporting member 60 is made of metals such as aluminum, ferrous metals, and the like. For this reason, the heat generated in the light-emitting element 89 is transmitted from the metal plate 887 of the light source substrate 88 to the light source supporting member 60, and the heat of the light source supporting member 60 is transmitted to the first frame 40. Accordingly, it is possible to suppress the rise of temperature in the light-emitting element 89 to be low.

Configuration of Light Guide Plate 80

Figure 6A:
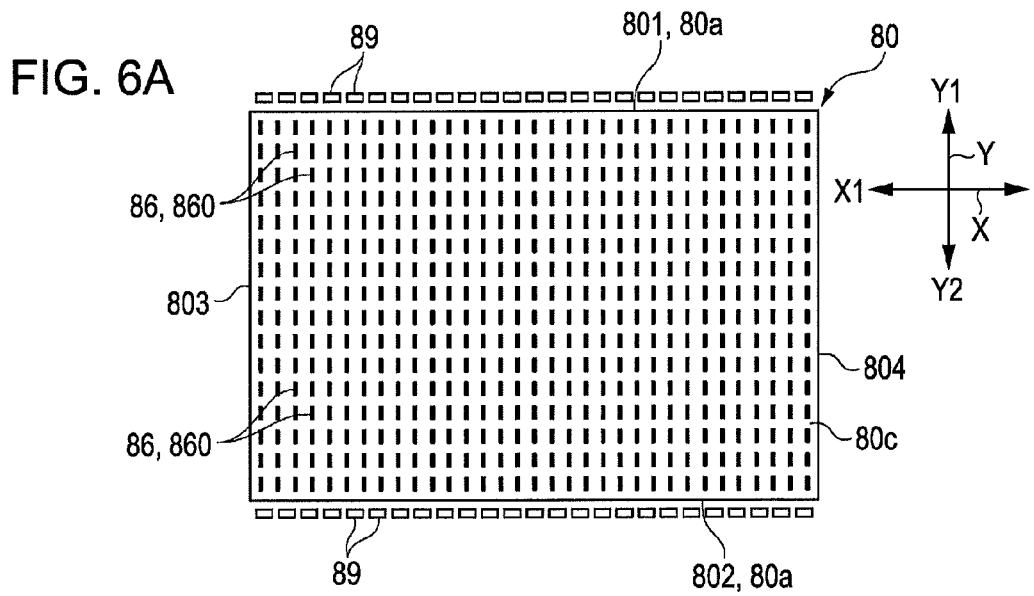
FIGS. 6A to 6C are explanatory diagrams of a light guide plate which is used in an illumination device of a liquid crystal display device according to a first embodiment of the invention.
Figure 6B:
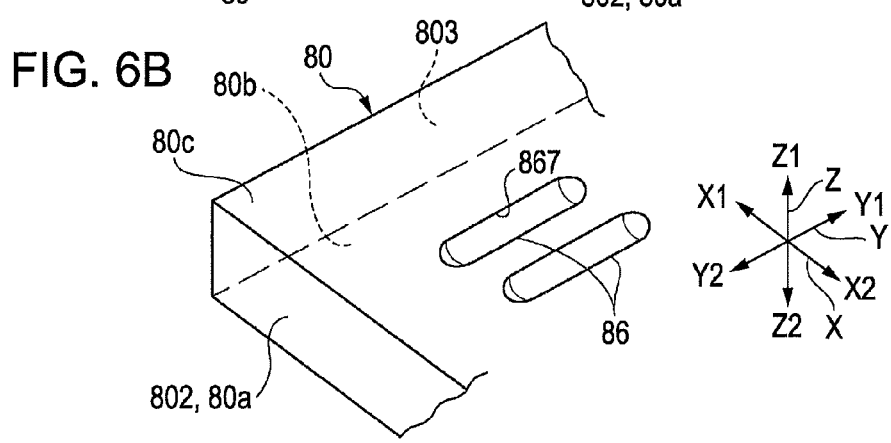
Figure 6C:
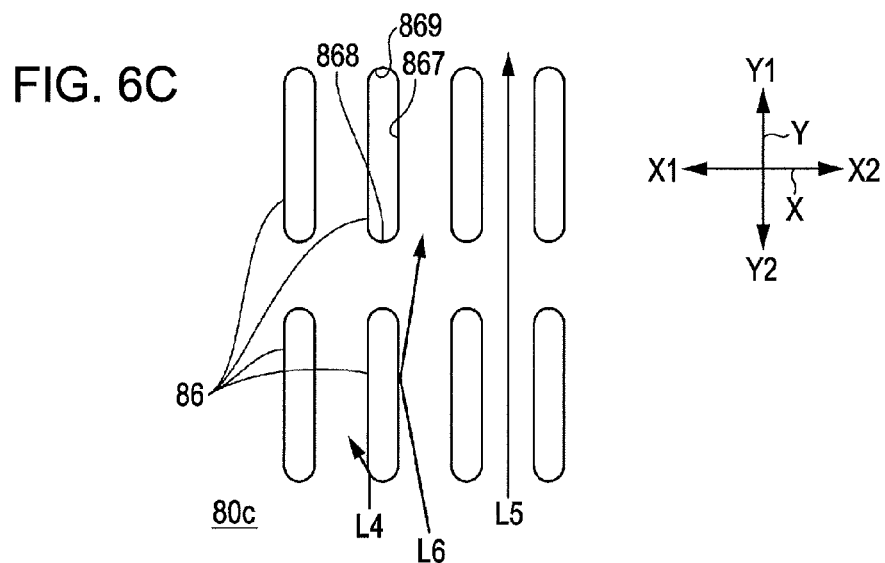
Figure 7A:
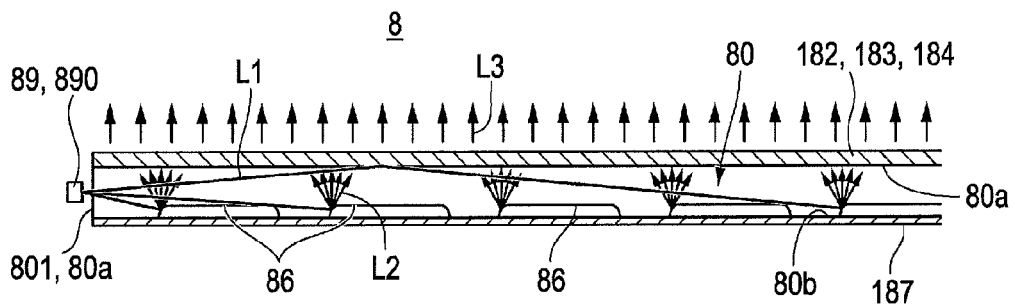
FIGS. 7A to 7C are explanatory diagrams illustrating a state in which illumination light is emitted from the light guide plate shown in FIGS. 6A to 6C.
Figure 7B:
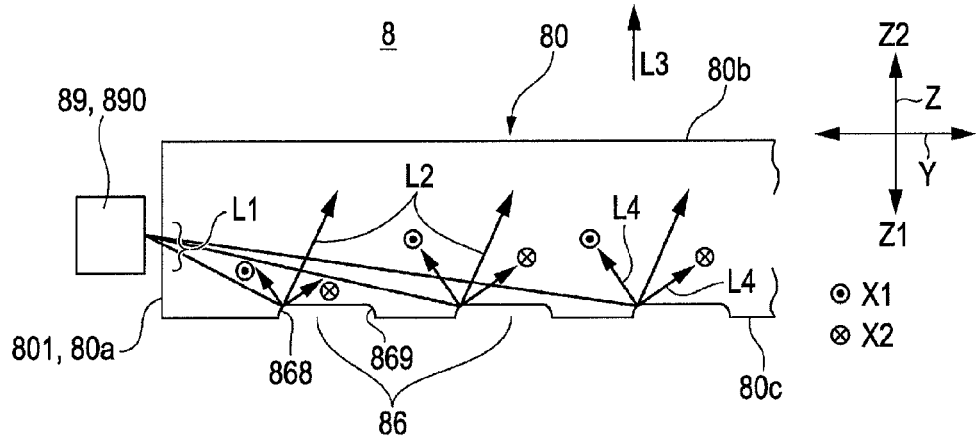
Figure 7C:
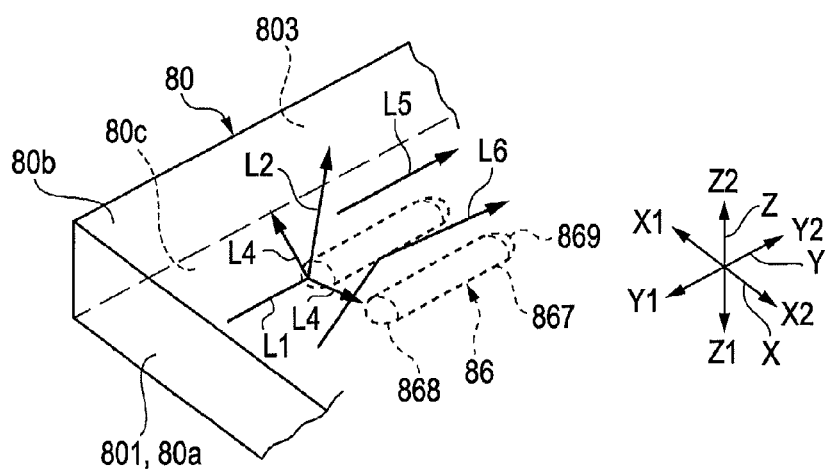

FIGS. 6A to 6C are explanatory diagrams of the light guide plate 80 which is used in the illumination device 8 of the liquid crystal display device 100 according to a first embodiment of the invention, and FIGS. 6A to 6C are respectively a bottom view when the light guide plate 80 is seen from the lower surface 80c side, a perspective view when the groove 86 is seen from the lower surface 80c side, and a bottom view when the groove 86 is seen from the lower surface 80c side. FIGS. 7A to 7C are explanatory diagrams illustrating a state in which illumination light is emitted from the light guide plate 80 shown in FIGS. 6A to 6C, and FIGS. 7A to 7C are respectively a cross-sectional view showing a state in which light incident to the inside of the light guide plate 80 is emitted as illumination light while advancing through the inside of the light guide plate 80, a cross-sectional view showing a state in which light is reflected on the groove 86 inside the light guide plate 80, and an explanatory diagram when a state in which light is reflected on the groove 86 is seen from the light-emitting surface 80b side.

As shown in FIGS. 6A to 7C, the lower surface 80c of the light guide plate 80 is used as a diffusion reflecting surface on which a plurality of linear grooves 86 are formed. In the present embodiment, in the light guide plate 80, the side end surfaces 801 and 802 on which a plurality of light-emitting elements 89 are arranged, and which extend in the X-axis direction (a first direction) are used as the light incident portion 80a, and on the lower surface 80c of the light guide plate 80, the groove 86 (linear groove) is formed so as to face in a longitudinal direction in the Y-axis direction (a second direction) so as to be orthogonal to the light incident portion 80a. In addition, on the lower surface 80c of the light guide plate 80, a plurality of grooves 86 which linearly extend in the Y-axis direction are arranged on the extension of the groove 86 to thereby constitute a groove column 860, and a plurality of groove rows 860 are provided in parallel in the X-axis direction. In the present embodiment, the grooves 86 have the same length dimensions, and are arranged at regular intervals within the groove column 860. For this reason, within the groove column 860, a spacing between the grooves 86 adjacent to each other in the Y-axis direction is constant. In addition, in the X-axis direction, the groove rows 860 are formed at regular intervals.

Here, the groove 86 has a planar shape of an ellipse directing the longitudinal direction in the Y-axis direction, and end portions 868 and 869 on both sides in the Y-axis direction have a semicircular planar shape. In addition, a semicircular side surface 867 (an outer circumferential surface) positioned on both sides of the groove 86 in the X-axis direction linearly extends in the Y-axis direction. In addition, an inner lower portion of a portion corresponding to a Z-direction (a top portion) in an XZ transverse section of the groove 86 is formed in a semicircular shape having of a radius of curvature of about 30 μm to 80 μm. In addition, an opening width (a width in the X-axis direction) of the groove 86 is, for example, 100 μm to 300 μm, and a depth (a length in the Z-axis direction) of the groove 86 is, for example, 100 μm to 700 μm.

In the illuminating device 8 configured as above, light emitted from the light-emitting element 89 is incident from the light incident portion 80a as shown by arrow L1, and then advances through the inside of the light guide plate 80 while repeating total reflection inside the light guide plate 80. In this instance, as shown by arrow L2, a part of the light reflected on the end portion 868 of the light-emitting element 89 side of the groove 86 advances towards the light-emitting surface 80b, and as shown by arrow L3, is emitted from the light-emitting surface 80b as illumination light. In addition, the part of the light reflected on the end portion 868 of the light-emitting element 89 side of the groove 86 advances towards one side X1 in the X-axis direction and the other side X2 as shown by arrow L4, while greatly containing a component of the one side X1 and a component of the other side X2.

In addition, a part of the light advancing through the inside of the light guide plate 80 passes between the grooves 86 as shown by arrow L5, and advances in a direction spaced apart from the light-emitting element 89 in the Y-axis direction. In addition, the part of the light advancing through the inside of the light guide plate 80 is reflected on the side surface 867 (a semicircular outer circumferential surface) of the groove 86 as shown in arrow L6, and advances in a direction spaced apart from the light-emitting element 89 in the Y-axis direction. The light is reflected on the end portion 868 of the light-emitting element 89 side of the groove 86 at a position of being spaced apart from the light-emitting element 89, and emitted from the light-emitting surface 80$b$ as illumination light.

Manufacturing Method of Light Guide Plate 80

Figure 8:
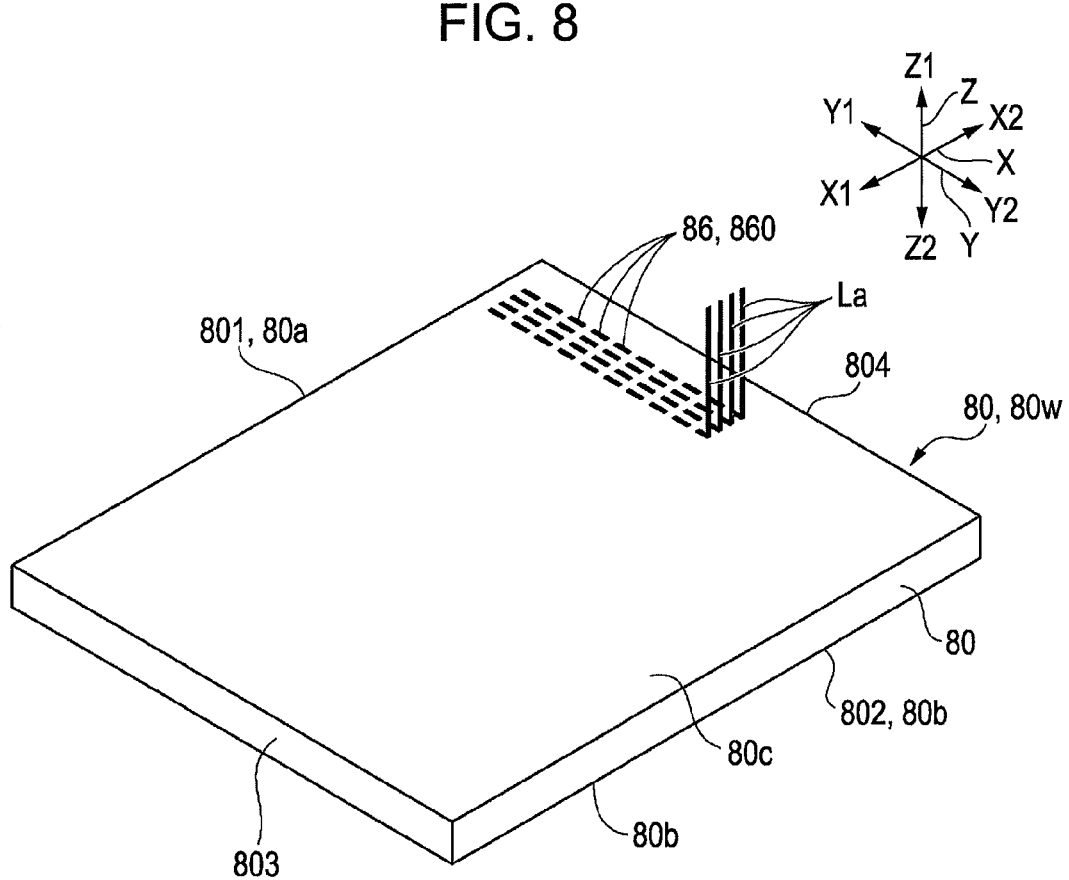
FIG. 8 is an explanatory diagram illustrating a manufacturing method of the light guide plate shown in FIGS. 6A to 6C.

FIG. 8 is an explanatory diagram illustrating a manufacturing method of the light guide plate 80 shown in FIGS. 6A to 6C. When manufacturing the light guide plate 80 which has been described with reference to FIGS. 6A to 7C, as shown in FIG. 8, a resin plate 80$w$ for light guide plate is formed by an extrusion molding and an injection molding, and then the resin plate 80$w$ is placed on an XY stage (not shown) so that one surface (the lower surface 80$c$ of the light guide plate 80) of the resin plate 80$w$ is directed upwards. Next, the resin plate 80$w$ is irradiated with a laser beam La of carbon dioxide laser and a Femtosecond laser, and a polymeric material constituting the resin plate 80$w$ at the irradiation position is melted and evaporated, thereby forming the groove 86. In the present embodiment, four laser beams La are generated from a laser beam emitted from a laser device.

More specifically, the resin plate 80$w$ is moved in the Y-axis direction by moving the XY stage while turning on and off four laser beams La at a predetermined timing, and the irradiation position of the laser beam La is relatively moved in the Y-axis direction, thereby simultaneously forming groove rows 860 of four rows. In addition, by relatively moving the resin plate 80$w$ in the X-axis direction by the movement of the XY stage after forming the groove rows 860 of four rows, the groove rows 860 of new four rows are formed in a position deviated in the X-axis direction with respect to the groove rows 860 of four rows having been previously formed. By repeating the above described process, the grooves 86 are formed almost all over the light guide plate 80. In this instance, when adjusting a moving speed of the resin plate 80$w$ in the Y-axis direction and the timing turning on and off the laser beam La, a length and a pitch of the groove 86 may be controlled, and when adjusting an interval of the laser beams La and an amount of movement of the resin plate 80$w$ in the X-axis direction, a pitch of the groove column 860 in the X-axis direction may be controlled. In addition, when adjusting power of the laser beam La, a depth (a depth in the Z-axis direction) of the groove 86 may be controlled, and when adjusting a beam diameter of the laser beam La, a width dimension of the groove 86 (a width and a thickness in the X-axis direction) may be controlled.

Main Effect of the Present Embodiment

As described above, in the liquid crystal display device 100 and the illumination device 8 according to the present embodiment, the side end surfaces 801 and 802 which extend in the X-axis direction (the first direction/a direction in which the light incident portion 80$a$ extends/a direction in which the plurality of light-emitting elements are arranged) in the light guide plate 80 are used as the light incident portion 80$a$, and light emitted from the light source 890 (the light-emitting element 89) is incident to the inside of the light guide plate 80 from the light incident portion 80$a$, and then advances through the inside of the light guide plate 80 while repeating total reflection inside the light guide plate 80. Next, the light is reflected and diffused on the groove 86, and illumination light is emitted from the light-emitting surface 80$b$. Here, the groove 86 faces the longitudinal direction in the Y-axis direction (the second direction/a direction in which light advances inside the light guide plate 80), and therefore, a part of the light inside the light guide plate 80 passes between the grooves 86 to advance in a direction spaced apart from the light incident portion 80$a$ in the Y-axis direction, and at the same time, a part of the light is reflected on the side surface 867 of the groove 86 to advance in a direction spaced apart from the light incident portion 80$a$ in the Y-axis direction. Consequently, in a state of suppressing the spread (diffusion) of light in the X-axis direction, the straight advance property of light in the Y-axis direction is enhanced. For this reason, it is possible to increase intensity of illumination light at a position of being spaced apart from the light incident portion 80$a$. In addition, since a part of the light inside the light guide plate 80 is reflected on the end portion 868 of a side in which the light incident portion 80$a$ is positioned in the groove 86 and advances in the X-axis direction, light advances even in the X-axis direction. Therefore, when the liquid crystal panel 10 and the light guide plate 80 are size-enlarged, intensity distribution of illumination light is uniformalized both in the X-axis direction and the Y-axis direction.

Second Embodiment

Figure 9A:
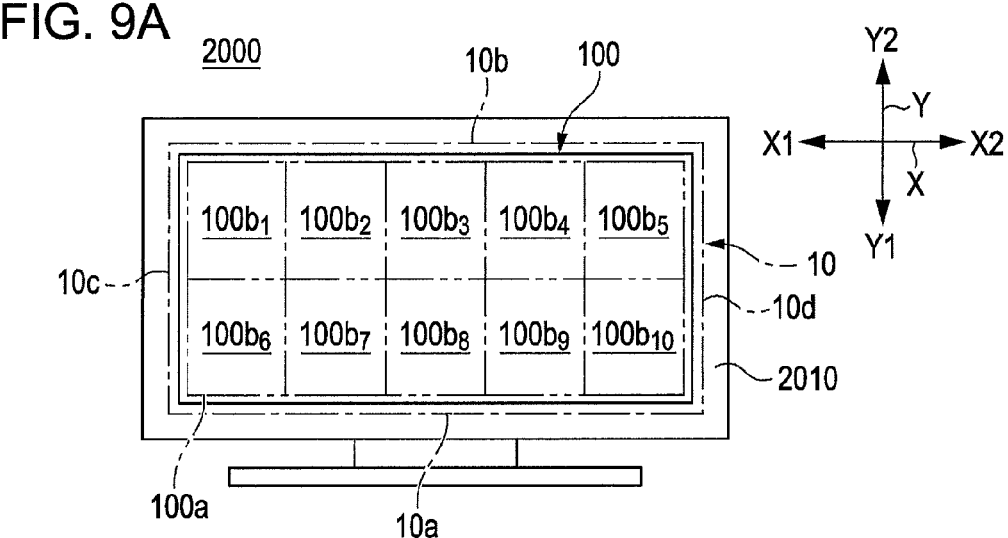
FIGS. 9A and 9B are explanatory diagrams of a liquid crystal television (electronic apparatus) including a liquid crystal display device according to a second embodiment of the invention.
Figure 9B:
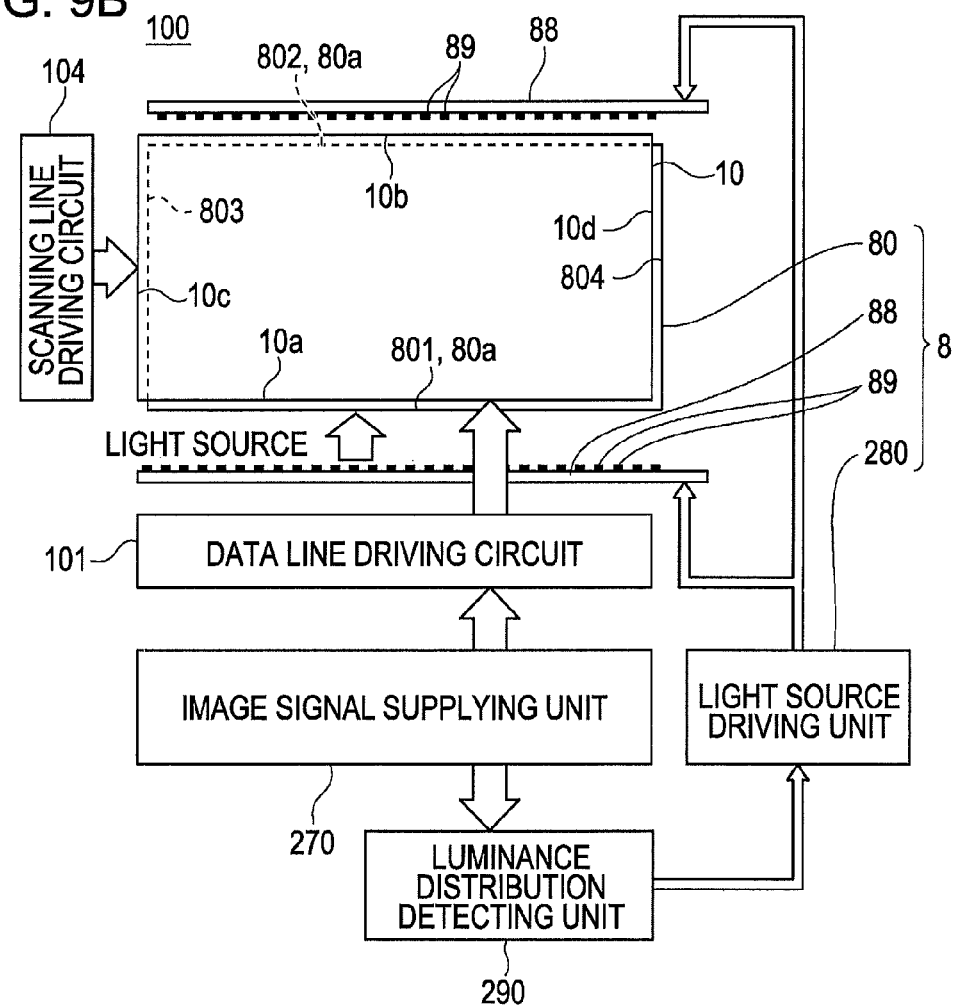

FIGS. 9A and 9B are explanatory diagrams of a liquid crystal television (electronic apparatus) including the liquid crystal display device 100 according to a second embodiment of the invention, and FIGS. 9A and 9B are respectively an explanatory diagram schematically illustrating an appearance of the liquid crystal television, and a block diagram illustrating an electrical configuration of a display device. FIG. 10 is an explanatory diagram illustrating a planar configuration of the light guide plate 80 which is used in the illumination device 8 of the liquid crystal display device 100 according to a second embodiment of the invention. In addition, a specific configuration of the present embodiment is the same as that of the first embodiment, and thus, like reference numerals denote like elements throughout the drawings, and descriptions thereof will be omitted.

An electronic apparatus 2000 shown in FIGS. 9A and 9B is a liquid crystal television, and has the liquid crystal display device 100 including the liquid crystal panel 10 and the illumination device 8 in the similar manner as that in the first embodiment.

In the liquid crystal display device 100 according to the present embodiment, emission intensity of illumination light from the illumination device 8 is controlled for each region by associating with drive in the liquid crystal panel 10, thereby promoting contrast improvement. More specifically, in the liquid crystal display device 100 of the present embodiment, an image display region 100$a$ is first divided into a plurality of regions. In the present embodiment, the image display region 100$a$ is divided into two in the Y-axis direction, and into five in the X-axis direction. For this reason, the image display region 100$a$ is divided into a total of ten regions 100$b_1$ to 100$b_{10}$. In addition, in the present embodiment, to correspond to luminance of each of the image regions 100$b_1$ to 100$b_{10}$ displayed on the liquid crystal panel 10, illumination light having large intensity from the illumination device 8 is emitted to a region displayed with high luminance, and illumination light having small intensity from the illumination device 8 is emitted to a region displayed with low luminance. By the local dimming method, contrast may be improved, and power consumption may be reduced.

In adopting the local dimming method, in the liquid crystal display device 100 according to the present embodiment, as shown in FIG. 10, the light guide plate 80 is divided into a plurality of regions $80b_1$ to $80b_{10}$ so as to be stacked on the regions $100b_1$ to $100b_{10}$ of the image display region 100a, and the light-emitting elements 89 (the light source 890) are divided into a plurality of blocks $89b_1$ to $89b_{10}$ which are divided in the X-axis direction and the Y-axis direction to correspond to the regions $80b_1$ to $80b_{10}$ of the light guide plate 80. In addition, when the light guide plate 80 is divided into the plurality of regions $80b_1$ to $80b_{10}$ accompanying the blocking in the light-emitting elements, a configuration of dividing the light guide plate 80 for each of the regions $80b_1$ to $80b_{10}$ may be adopted; however, a single light guide plate 80 may be virtually divided into the plurality of regions $80b_1$ to $80b_{10}$. In addition, when the light guide plate 80 is divided into the plurality of regions $80b_1$ to $80b_{10}$, a configuration in which the light guide plate 80 may be divided into blocks composed of the regions $80b_1$ to $80b_5$ and blocks composed of the regions $80b_6$ to $80b_{10}$ is adopted, so that each of the blocks may be virtually divided into the plurality of regions $80b_1$ to $80b_5$ and regions $80b_6$ to $80b_{10}$. Such configuration may suppress mixing of light which advances through the inside of the light guide plate, between two adjacent blocks in the Y-axis direction (emission direction and advancing direction of light), and further enhance effects of the local dimming method. In addition, the mixing of the light between the adjacent blocks in the X-axis direction may be suppressed by the effects of the invention; however, when the light guide plate is not divided, the light passes through and advances the adjacent blocks as is, resulting in mixing of the light between the adjacent blocks in the Y-axis direction.

Further, when dividing the light guide plate 80 into the plurality of regions $80b_1$ to $80b_{10}$, a configuration in which each two of two adjacent regions in the Y-axis (regions $80b_1$ and $80b_6$, regions $80b_2$ and $80b_7$, regions $80b_3$ and $80b_8$, regions $80b_4$ and $80b_9$, and regions $80b_5$ and $80b_{10}$) are formed as a single block which is consecutive without being divided in the Y-axis direction, and blocks which are divided into five as a whole in the X-axis direction are formed may be adapted, thereby adjusting luminance of illumination light in each of the blocks. In this manner, as in the first embodiment, even though the grooves having the same dimension are aligned in the Y-axis direction at regular intervals, light is incident from each of the side end surfaces 801 and 802 sides which are both end portions of each block, and therefore, the illumination light emitted from the light-emitting surface 80b may be prevented from being degraded even though being spaced apart from the light incident portion 80a.

To corresponding to the above described configuration, as shown in FIGS. 9A and 9B, a luminance distribution detecting unit 290 that detects luminance of each of the regions $100b_1$ to $100b_{10}$ of the liquid crystal panel 10 using image signals is provided in the liquid crystal display device 100, and the light source driving unit 280 controls emission intensity from the plurality of light-emitting elements 89 in blocks $89b_1$ to $89b_{10}$ based on detection results of the luminance distribution detecting unit 290. In addition, the light source driving unit 280 supplies the same driving current to the light-emitting elements 89 belonging to the same blocks $89b_1$ to $89b_{10}$.

In the liquid crystal display device 100 and the illuminating device 8 according to the present embodiment which are configured as above, in the similar manner as that in the first embodiment, on the light guide plate 80, the side end surfaces 801 and 802 extending in the X-axis direction (the first direction) are used as the light incident portion 80a, and the groove 86 is formed to face in the longitudinal direction in the Y-axis direction (the second direction) so that the groove 86 is orthogonal to the light incident portion 80a on the lower surface 80c of the light guide plate 80. In addition, on the lower surface 80c of the light guide plate 80, the groove rows 860 in which grooves 86 are linearly arranged in the Y-axis direction are formed in parallel in the X-axis direction, and therefore, in the present embodiment, the grooves 86 are aligned at regular intervals within the groove column 860.

Accordingly, in the liquid crystal display device 100 and the illuminating device 8 according to the present embodiment, as described with reference to FIGS. 6A to 7C in the similar manner as that in the first embodiment, a part of the light inside the light guide plate 80 passes between the grooves 86 to thereby advance in a direction spaced apart from the light incident portion 80a in the Y-axis direction, and at the same time, a part of the light is reflected on the side surface 867 of the groove 86 to thereby advance in a direction spaced apart from the light incident portion 80a in the Y-axis direction. Therefore, intensity of illumination light at a position of being spaced apart from the light incident portion 80a may be enhanced. In addition, inside the light guide plate 80, a part of the light is reflected on the end portion 868 of the groove 86 of a side where the light incident portion 80a is positioned to thereby advance in the X-axis direction, and therefore, light advances even in the X-axis direction. Therefore, even when the liquid crystal panel 10 and the light guide plate 80 are size-enlarged, intensity distribution of the illumination light may be uniformalized even both in the X-axis direction and the Y-axis direction.

In addition, according to the present embodiment, since the groove 86 faces the longitudinal direction in the Y-axis direction, diffusion reflection of light in the X-axis direction primarily occurs only in the end portion 868 of the light source 890 side of the groove 86. For this reason, when performing local dimming, leakage of light to the adjacent region on the light guide plate 80 may be kept low, thereby effectively relieving residual images.

Third Embodiment

Figure 11:
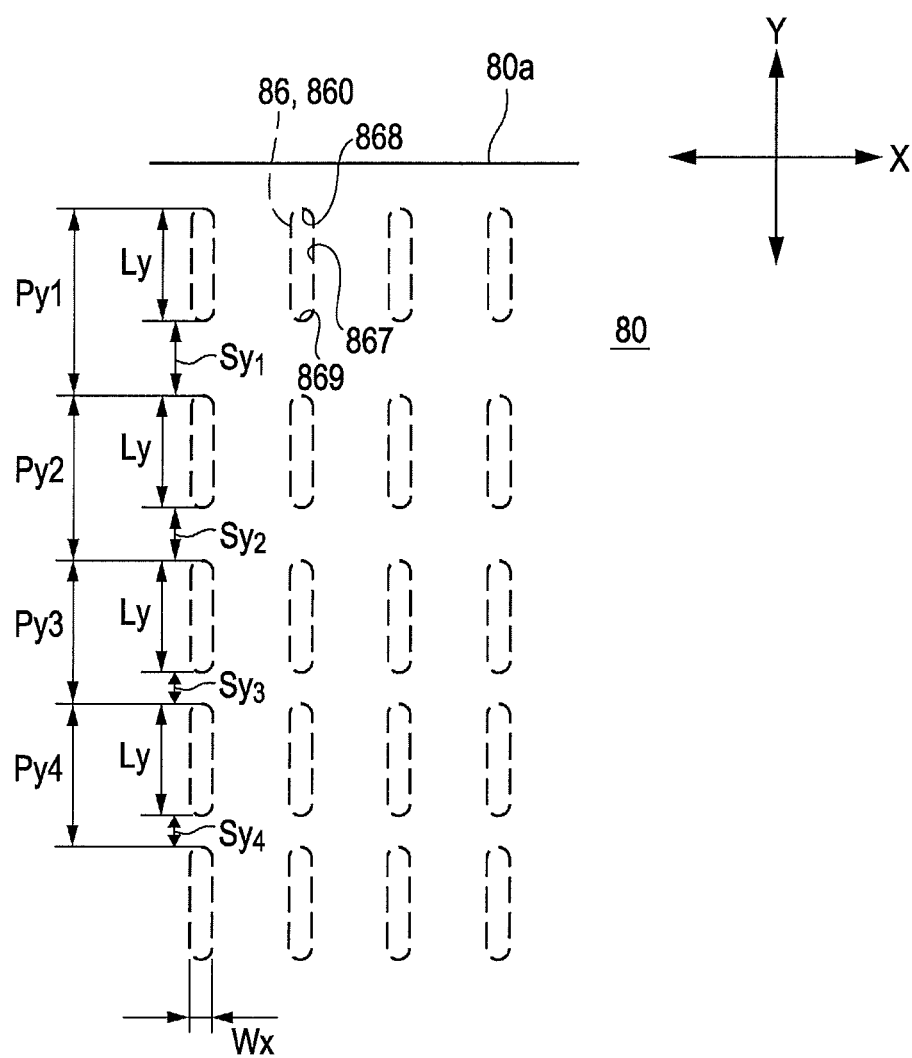
FIG. 11 is an explanatory diagram illustrating a planar configuration of a groove of a light guide plate which is used in a liquid crystal display device according to a third embodiment of the invention.

FIG. 11 is an explanatory diagram illustrating a planar configuration of the groove 86 of the light guide plate 80 which is used in the liquid crystal display device 100 according to a third embodiment of the invention. In addition, a basic configuration of the present embodiment is the same as that in the first embodiment, and thus, like reference numerals denote like elements throughout the drawings, and descriptions thereof will be omitted.

Even in the present embodiment as shown in FIG. 11, in the similar manner as that in the first and second embodiments, on the light guide plate 80, the side end surface extending in the X-axis direction (the first direction) is used as the light incident portion 80a, and on the lower surface 80c of the light guide plate 80, the groove 86 is formed to face in the longitudinal direction in the Y-axis direction (the second direction) so that the groove 86 is orthogonal to the light incident portion 80a. In addition, on the lower surface 80c of the light guide plate 80, the plurality of groove rows 860 in which the grooves 86 are linearly arranged in the Y-axis direction (on the extension) are aligned in the X-axis direction, so that in the present embodiment, the grooves 86 are arranged at regular intervals in the X-axis direction.

In the light guide plate 80 configured as above, since the grooves 86 face in the longitudinal direction in the Y-axis direction, diffusion reflection of light in the X-axis direction and the Z-axis direction primarily occurs only in the end portion 868 of the light source 890 side of the groove 86. Therefore, in the present embodiment, existing density of the end portion 868 positioned in the light incident portion 80a side of the groove 86 is increased as being spaced apart from a side where the light incident portion 80a is positioned, in the Y-axis direction. In realizing the above described configuration, according to the present embodiment, a width dimension Wx of each groove 86 is constant; however, pitches $Py_1$, $Py_2$, $Py_3$, ... of the end portion 868 of the groove 86 are reduced as being spaced apart from the side where the light incident portion 80a is positioned within the groove column 860 in the Y-axis direction, as shown in the following relational expression.

$Py_1 > Py_2 > Py_3 \ldots$

More specifically, within the groove column 860, even though a length dimension Ly of the groove 86 in the Y-axis direction is the same, spacings $Sy_1$, $Sy_2$, $Sy_3$, ... between the adjacent grooves 86 in the Y-axis direction are reduced as being spaced apart from the side where the light incident portion 80a is positioned within the groove column 860, in the Y-axis direction, as shown in the following relational expression.

$Sy_1 > Sy_2 > Sy_3 \ldots$

For this reason, a degree in which diffusion reflection of the light in the X-axis direction and the Z-axis direction occurs is increased as being spaced apart from the side where the light incident portion 80a is positioned, in the Y-axis direction. Therefore, intensity distribution of illumination light may be uniformalized in the Y-axis direction.

Fourth Embodiment

Figure 12:
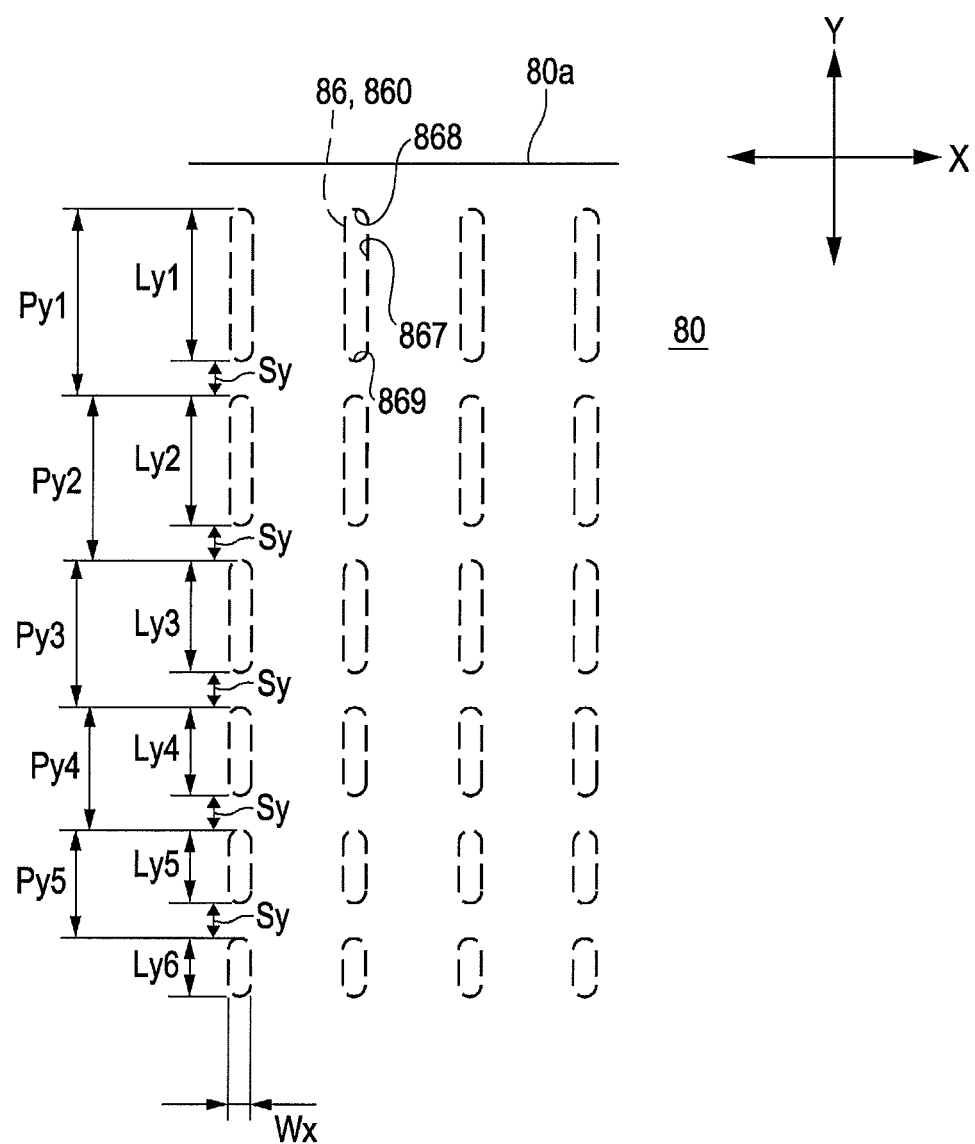
FIG. 12 is an explanatory diagram illustrating a planar configuration of a groove of a light guide plate which is used in a liquid crystal display device according to a fourth embodiment of the invention.

FIG. 12 is an explanatory diagram illustrating a planar configuration of the groove 86 of the light guide plate 80 which is used in the liquid crystal display device 100 according to a fourth embodiment of the invention. In addition, a basic configuration of the present embodiment is the same as that in the first embodiment, and thus, like reference numerals denote like elements throughout the drawings, and descriptions thereof will be omitted.

As shown in FIG. 12, in the present embodiment, in the similar manner as that in the first and second embodiments, on the light guide plate 80, the side end surface extending in the X-axis direction (the first direction) is used as the light incident portion 80a, and on the lower surface 80c of the light guide plate 80, the groove 86 is formed to face in the longitudinal direction in the Y-axis direction (the second direction) so that the groove 86 is orthogonal to the light incident portion 80a. In addition, on the lower surface 80c of the light guide plate 80, the groove rows 860 in which grooves 86 are linearly arranged in the Y-axis direction are formed in parallel in the X-axis direction, and therefore, in the present embodiment, the grooves 86 are aligned at regular intervals.

In the light guide plate 80 according to the present embodiment configured as above, in the similar manner as that in the third embodiment, existing density of the end portion 868 positioned in the light incident portion 80a side of the groove 86 is increased as being spaced apart from a side where the light incident portion 80a is positioned, in the Y-axis direction.

In realizing the above described configuration, according to the present embodiment, a width dimension Wx of each groove 86 is constant; however, pitches $Py_1$, $Py_2$, $Py_3$, ... of the end portion 868 of the groove 86 are reduced as being spaced apart from the side where the light incident portion 80a is positioned within the groove column 860 in the Y-axis direction, as shown in the following relational expression.

$Py_1 > Py_2 > Py_3 \ldots$

More specifically, within the groove column 860, a spacing Sy between the adjacent grooves 86 in the Y-axis direction is constant; however, length dimensions $Ly_1$, $Ly_2$, $Ly_3$, ... of the groove 86 in the Y-axis direction are reduced as being spaced apart from the side where the light incident portion 80a is position within the groove column 860 in the Y-axis direction, as shown in the following relational expression.

$Ly_1 > Ly_2 > Ly_3 \ldots$

For this reason, a degree in which diffusion reflection of the light in the X-axis direction and the Z-axis direction occurs is increased as being spaced apart from the side where the light incident portion 80a is positioned, in the Y-axis direction. Therefore, intensity distribution of illumination light may be uniformalized in the Y-axis direction.

Fifth Embodiment

Figure 13:
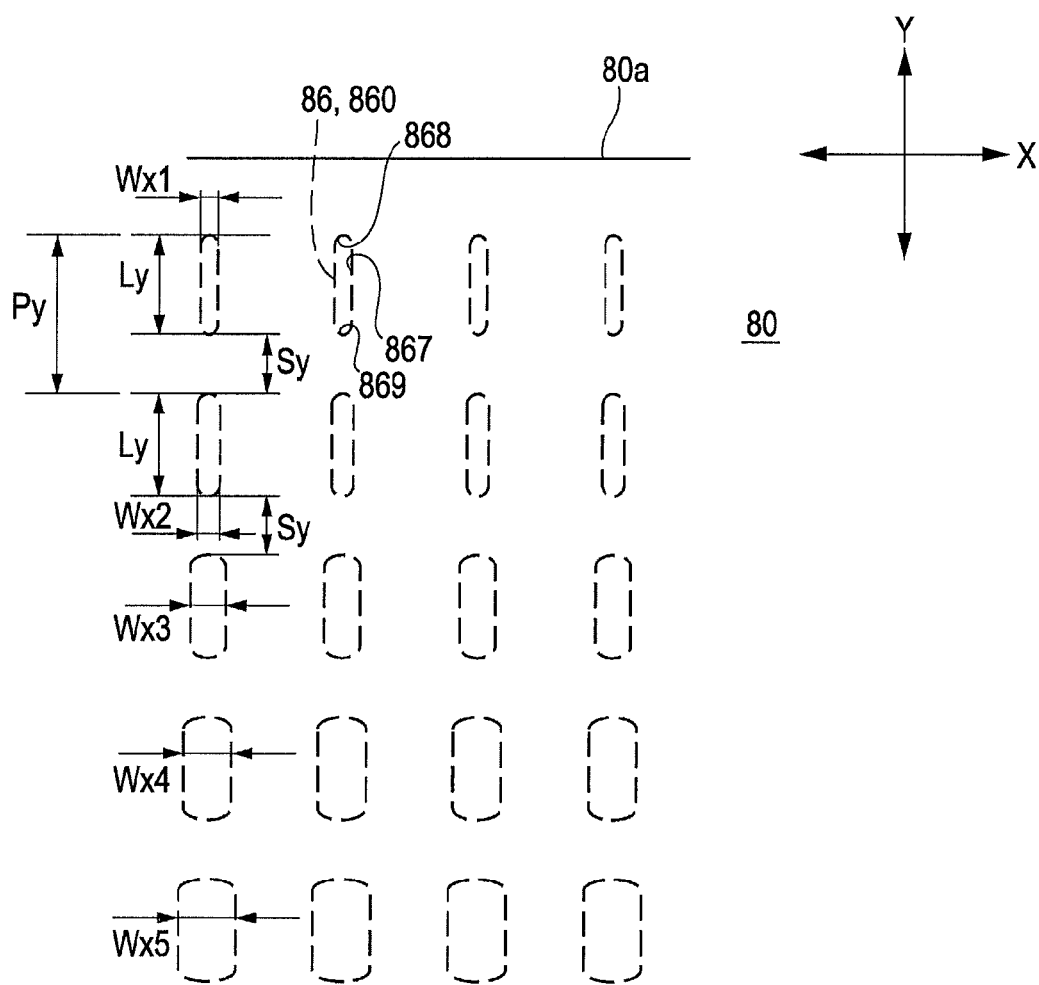
FIG. 13 is an explanatory diagram illustrating a planar configuration of a groove of a light guide plate which is used in a liquid crystal display device according to a fifth embodiment of the invention.
Figure 14A:
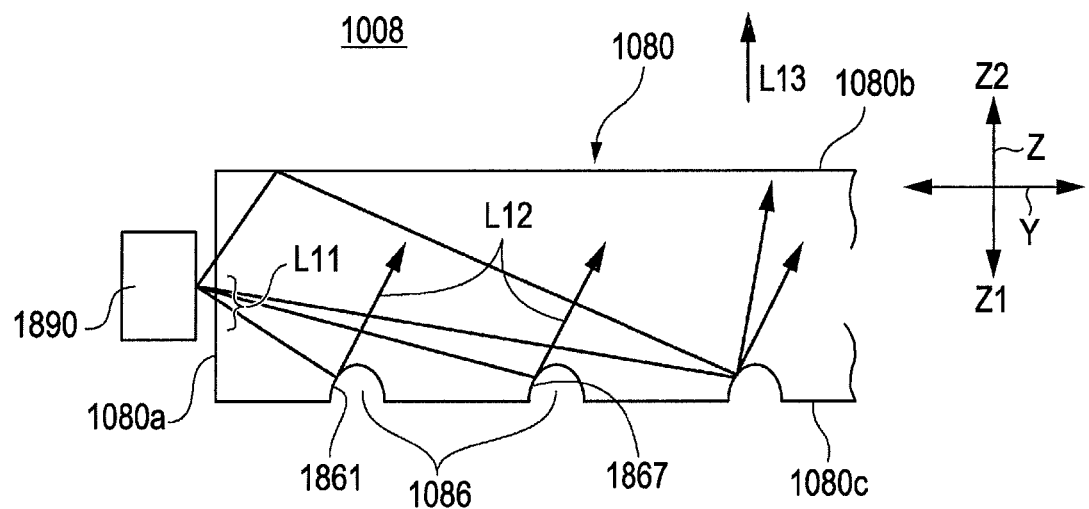
FIGS. 14A and 14B are explanatory diagrams of an existing light guide plate.
Figure 14B:
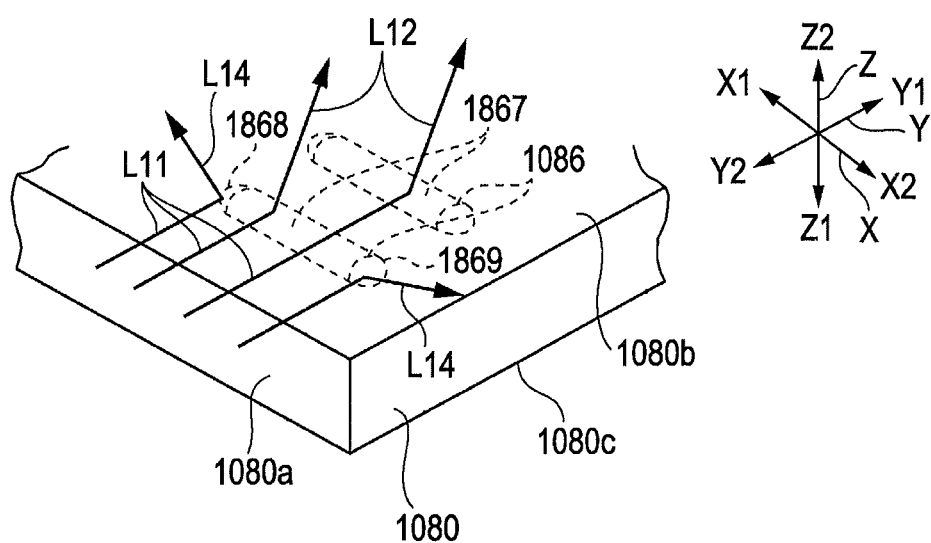

FIG. 13 is an explanatory diagram illustrating a planar configuration of the groove 86 of the light guide plate 80 which is used in the liquid crystal display device 100 according to a fifth embodiment of the invention. In addition, a basic configuration of the present embodiment is the same as that in the first embodiment, and thus, like reference numerals denote like elements throughout the drawings, and descriptions thereof will be omitted.

As shown in FIG. 13, in the present embodiment, in the similar manner as that in the first and second embodiments, on the light guide plate 80, the side end surface extending in the X-axis direction (the first direction) is used as the light incident portion 80a, and on the lower surface 80c of the light guide plate 80, the groove 86 is formed to face in the longitudinal direction in the Y-axis direction (the second direction) so that the groove 86 is orthogonal to the light incident portion 80a. In addition, on the lower surface 80c of the light guide plate 80, the groove rows 860 in which grooves 86 are linearly arranged in the Y-axis direction are formed in parallel in the X-axis direction, and therefore, in the present embodiment, the grooves 86 are aligned at regular intervals within the groove column 860.

In the light guide plate 80 configured as above, in the similar manner as that in the third embodiment, existing density of the end portion 868 positioned in the light incident portion 80a side of the groove 86 is increased as being spaced apart from a side where the light incident portion 80a is positioned, in the Y-axis direction. In realizing the above described configuration, in the present embodiment, a pitch $P_y$ of the end portion 868 of the groove 86, a length dimension $L_y$ of the groove 86, and a spacing $S_y$ of the groove 86 are the same; however, width dimensions $Wx_1$, $Wx_2$, $Wx_3$, ... of the groove 86 in the X-axis direction are increased as being spaced apart from the side where the light incident portion 80*a* is positioned within the groove column 860 in the Y-axis direction, as shown the following relational expression.

$$W_{x_1} < W_{x_2} < W_{x_3} \ldots$$

For this reason, a degree in which diffusion reflection of the light in the X-axis direction and the Z-axis direction occurs is increased as being spaced apart from the side where the light incident portion 80*a* is positioned, in the Y-axis direction. Therefore, intensity distribution of illumination light may be uniformalized in the Y-axis direction.

Another Embodiment

In the above described embodiments, a configuration in which the plurality of light-emitting elements 89 are arranged in a direction in which the scanning line (the X-axis direction) extends has been described; however, the invention may be applied to the liquid crystal display device 100 in which the plurality of light-emitting elements 89 are arranged in a direction (the Y-axis direction) in which a data line extends. In a case of the above configuration, local dimming may be adopted, and at the same time, a scan backlight method in which illumination light is emitted from the illumination device 8 may be adopted to correspond to an operation in which a pixel column selected by scanning signals is shifted. As a result, performance of a moving image may be improved.

Mounting Example of Electronic Apparatus

In the above described embodiments, an example in which the liquid crystal television is used as the electronic apparatus 2000 in which the liquid crystal display device 100 is mounted has been described; however, beyond the liquid crystal television, the liquid crystal display device 100 in which the invention is applied may be used in a display of a personal computer, and a display unit of an electronic apparatus such as a digital signage, a car navigation device, a portable information terminal, and the like.

The entire disclosure of Japanese Patent Application No. 2011-159626, filed Jul. 21, 2011 is expressly incorporated by reference herein.

What is claimed is:

1. An illumination device, comprising:
   a light guide plate having a first surface as a light emitting surface, a second surface opposed to the first surface, and a side surface;
   a plurality of light emitting elements aligned in a first direction along the side surface of the light guide plate, and each of the plurality of light emitting elements has a light emission surface facing the side surface;
   a scattering reflection region provided on the second surface, the scattering reflection region having a plurality of groove arrays, each of the groove arrays includes a plurality of grooves linearly extending in a second direction intersecting the first direction in in-plane directions, each of the plurality of grooves being positioned apart from each other in the second direction, the plurality of groove arrays being arranged in a parallel manner in the first direction, the plurality of grooves being configured with a shape to scatter light from the light emitting elements in different directions;
   a frame which holds the light guide plate, the frame supporting a part of the side surface and at least a peripheral region of the first surface, the frame including an upper plate portion and a protruding plate portion, both the upper plate portion and the protruding portion extending over an upper surface of the light guide plate, the upper plate portion having a first thickness greater than a second thickness of the protruding portion, and
   an edge of the scattering reflection region is disposed between the side end surface and the protruding plate portion in plan view,
   wherein no grooves are disposed between the side surface and the scattering reflection region on the second surface.

2. The illumination device according to claim 1, wherein each of the plurality of grooves extends in a longitudinal direction in the second direction.

3. The illumination device according to claim 2, wherein an existing density of an end portion of the plurality of grooves positioned on a side of the side surface is increases as a distance from the side surface is increased in the second direction.

4. The illumination device according to claim 1, wherein the second surface includes a plurality of edges and a peripheral region is disposed on a periphery of the scattering reflection region and between the edges and the scattering reflection region, and
   wherein no grooves are disposed on the peripheral region.

5. A liquid crystal display device comprising:
   the illumination device according to claim 1; and
   a liquid crystal panel which is arranged so as to be overlapped on the first surface of the light guide plate.

* * * * *